US008277212B2

(12) United States Patent
Gebert

(10) Patent No.: US 8,277,212 B2
(45) Date of Patent: Oct. 2, 2012

(54) HIGH POWER ROTATIONAL CYCLE MOULDING METHOD AND DEVICE

(75) Inventor: Klaus Gebert, Grünstadt (DE)

(73) Assignee: Abbott GmbH & Co. KG, Wiesbaden (DE)

(*) Notice: Subject to any disclaimer, the term of this patent is extended or adjusted under 35 U.S.C. 154(b) by 402 days.

(21) Appl. No.: 12/514,980

(22) PCT Filed: Nov. 23, 2007

(86) PCT No.: PCT/EP2007/062735

§ 371 (c)(1), (2), (4) Date: Dec. 1, 2009

(87) PCT Pub. No.: WO2008/062055

PCT Pub. Date: May 29, 2008

(65) Prior Publication Data

US 2010/0072666 A1 Mar. 25, 2010

(30) Foreign Application Priority Data

Nov. 24, 2006 (EP) .................................... 06024451

(51) Int. Cl.
*A01J 21/00* (2006.01)

(52) U.S. Cl. .................... 425/398; 425/348 R; 425/344; 425/345; 425/354; 425/353

(58) Field of Classification Search .............. 425/348 R, 425/344, 345, 354, 353, 398
See application file for complete search history.

(56) References Cited

U.S. PATENT DOCUMENTS 2,829,756 A 4/1958 Gercke at al.

(Continued)

FOREIGN PATENT DOCUMENTS

DE 20 39 933 2/1971

(Continued)

OTHER PUBLICATIONS

International Search Report for PCT/EP2007/062734, May 29, 2008, Abbott GmbH & Co. KG.

(Continued)

*Primary Examiner* — Joseph Del Sole
*Assistant Examiner* — David N Brown, II
(74) *Attorney, Agent, or Firm* — Edwards Wildman Palmer LLP; Peter C. Lauro, Esq.; Weiying Yang, Esq.

(57) ABSTRACT

The invention relates to a device for forming moldable bodies (57) from a moldable mass by means of a matrix grid (19), in which at least one cavity (21) is formed by lateral limiting elements (20), and at least one tool (17, 18) which compresses the moldable mass into the cavity (21). The inventive device is characterized by a compression partition (38) that can be displaced on the matrix grid (19) for portioning the moldable mass. Said compression partition (38) comprises lateral limiting elements (39) that correspond to the lateral limiting elements (20) of the matrix grid (19). The invention also relates to a method for forming moldable bodies (57) consisting of forming a moldable mass and guiding it to a matrix grid (19) such that it rests on the front face (45) of the lateral limiting elements (20) of the matrix grid (19). A compression partition (38) with lateral limiting elements (39), that correspond to the lateral limiting elements (20) of the matrix grid (19), is displaced towards the matrix grid (19) to reduce the part (14A) of the moldable mass on the lateral limiting elements (20) of the matrix grid (19) in the direction of a cavity (21) formed by the matrix grid (19) between the lateral limiting elements (20), thus portioning the moldable mass. At least one tool (17, 18) compresses the portions of the moldable mass in the cavity (21).

26 Claims, 31 Drawing Sheets

U.S. PATENT DOCUMENTS

Figure 1:
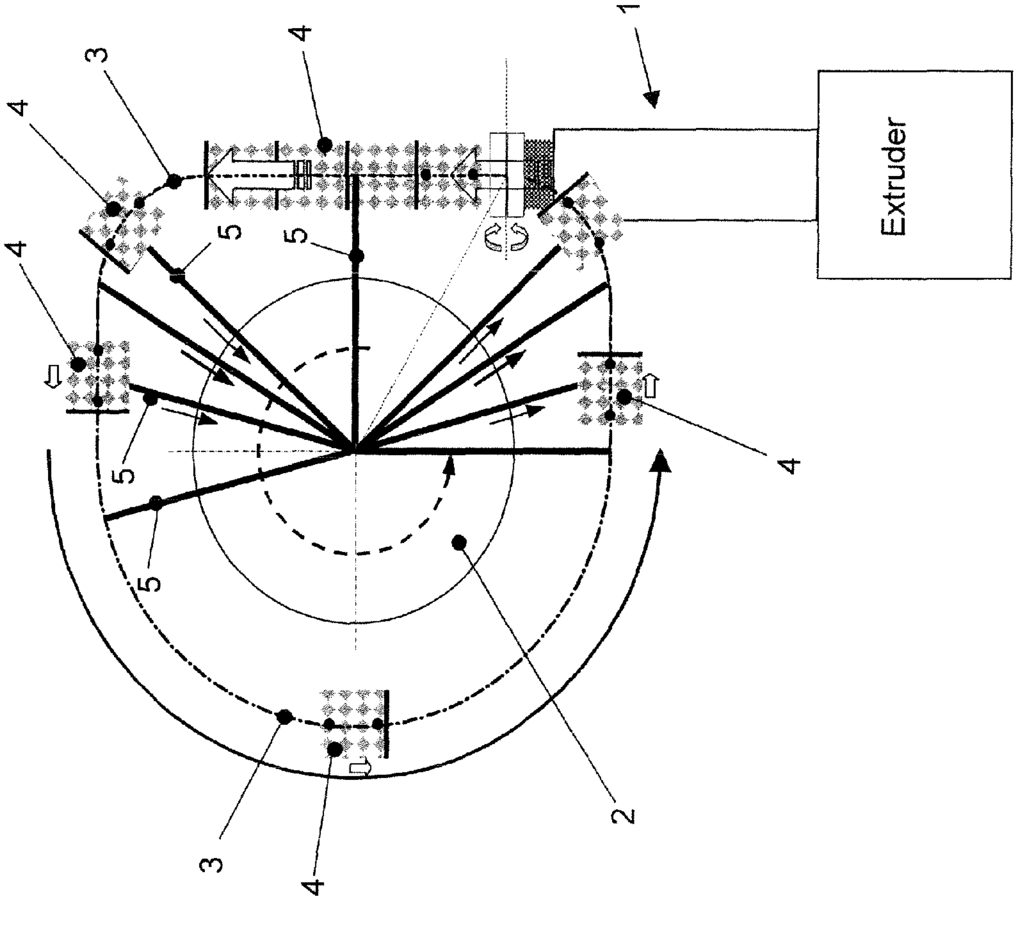

| | | | | | |
|---|---|---|---|---|---|
| 3,332,367 | A | * | 7/1967 | Sperry et al. | 264/37.29 |
| 4,086,045 | A | * | 4/1978 | Thiel et al. | 425/326.1 |
| 4,420,300 | A | * | 12/1983 | Winstead | 425/142 |
| 4,880,585 | A | | 11/1989 | Klimesch et al. | |
| 4,988,275 | A | | 1/1991 | Hinzpeter et al. | |
| 5,073,379 | A | | 12/1991 | Klimesch et al. | |

FOREIGN PATENT DOCUMENTS

| | | | | |
|---|---|---|---|---|
| DE | 28 30 479 | | | 1/1980 |
| DE | 3714031 | A1 | | 11/1988 |
| DE | 198 55 328 | | | 6/2000 |
| EP | 0240906 | A2 | | 10/1987 |
| EP | 0 298 244 | | | 1/1989 |
| EP | 0 328 793 | | | 8/1989 |
| EP | 0358105 | A2 | | 3/1990 |
| EP | 0358107 | A2 | | 3/1990 |
| EP | 0 691 121 | | | 1/1996 |
| EP | 1 020 285 | | | 7/2000 |
| EP | 1 306 012 | | | 5/2003 |
| FR | 330 819 | | | 4/1903 |
| GB | 321 748 | | | 11/1929 |
| GB | 568 223 | | | 3/1945 |
| RU | 2 041 825 | | | 8/1995 |
| SU | 599 993 | | | 3/1978 |
| WO | WO-96/35566 | | | 11/1996 |
| WO | WO9635565 | | * | 11/1996 |
| WO | WO-99/33624 | | | 7/1999 |
| WO | WO-03/086741 | | | 10/2003 |
| WO | WO-2008/062054 | | | 5/2008 |

OTHER PUBLICATIONS

English Translation of Written Opinion of the International Searching Authority for PCT/EP2007/062734, Abbott GmbH & Co. KG.

English Translation of Written Opinion of the International Searching Authority for PCT/EP2007/062735, Abbott GmbH & Co. KG.

International Search Report for PCT/EP2007/062735, May 29, 2008, Abbott GmbH & Co.

Written Opinion of the International Searching Authority for PCT/EP2007/062735, Abbott GmbH & Co.

* cited by examiner

HIGH POWER ROTATIONAL CYCLE MOULDING METHOD AND DEVICE

This application is the U.S. national phase, pursuant to 35 U.S.C. §371, of PCT international application Ser. No. PCT/EP2007/062735, filed Nov. 23, 2007, designating the United States and published in German on May 29, 2008 as publication WO 2008/062055 A1, which claims priority to European application Ser. No. 06024451.4, filed Nov. 24, 2006. The entire contents of the aforementioned patent applications are incorporated herein by this reference.

The present invention relates to a device for forming moldings from a moldable material. The device comprises a die grid, in which there is formed at least one receiving space formed by lateral limiting elements, and comprises at least one tool, with which the moldable material in the receiving space can be compressed. Furthermore, the invention relates to a method for forming moldings in which a moldable material is formed. The moldable material is fed to a die grid and portioned in a receiving space. After the portioning, at least one tool compresses the portions of moldable material in the receiving space to form the moldings.

Various devices and methods for producing tablets are known from the pharmaceutical industry. In the case of so-called rotary table tableting machines, for example, the material to be molded, which is in the form of bulk material, is fed by way of a fixed filling device into a likewise fixed die table, the receiving spaces (dies) of which are filled with the bulk material. Arranged above and below the receiving space are punches, which are guided by way of an upper and a lower compression roll for compressing the bulk material. The compression rolls have the effect that the punches are moved toward one another, whereby initially a rising pressure and, once the vertex point has been passed, a falling pressure is exerted on the bulk material, whereby it is compressed to form a tablet. A conventional rotary table tableting machine is described, for example, in DE 37 14 031 A1.

A disadvantage of known tableting machines is that the time interval during which the pressure required for compressing is exerted on the moldable material is limited. For many applications, it is desirable to prolong the so-called holding pressure time. With conventional tableting machines, this is only possible with a small time window.

EP 0 358 107 A2 discloses a method for producing pharmaceutical tablets in which the pharmaceutical mixture is extruded and the still plastic material is processed in a conventional tableting machine to form solid pharmaceutical moldings. In the case of this method, although an extruder can be advantageously used for forming and feeding in the moldable material, the disadvantages accompanying conventional tableting machines cannot be overcome. In addition, cost-effective feeding of the material would not be sufficiently possible.

U.S. Pat. No. 2,829,756 discloses a device in which an extruded plastic strand is cut up into elongate, cylindrical forms by co-running molding punches. A disadvantage of this device, and of the method put into operation on this device, is that the extruded plastic strand is not processed completely and a relatively high proportion of scrap, or of material which has to be re-processed, is produced. Working up pharmaceutical materials for renewed processing, and consequently feeding, into a sales product entails the risk of a change in the efficacy of the formulation occurring, whereby scrap is in turn produced.

Furthermore, it is known from EP 240 906 B1 to extrude polymer melts and deform them by injection molding or calendering. A disadvantage of the injection molding process is that it is not fully continuous, but works with operations recurring in a cycle, which cannot be speeded up to the extent required for mass production because of the cooling times required. Moreover, the temperature and pressure also disadvantageously change internal structures of the materials, and consequently the properties. Even when calendering with two rolls, the production rate is limited, because the rolls are only in contact along a line, with the result that only slowly running rolls allow adequate cooling time to cool the hot, still plastic strand to the extent that the moldings obtained are dimensionally stable. Furthermore, even when calendering with two rolls, the holding pressure times that can be realized are not obtained because of the linear contact of the rolls.

The calendering method with two calender rolls is developed by adding a so-called chain calender, as described in EP 0 358 105 B1. In the case of this chain calender, the still deformable strand of the extruder is compressed between two belts which are in contact in sections on the lateral surface, rotate in opposite directions and run parallel over the contact section or between a roller and a belt which rests on a segment of the roller shell and runs in a rotational manner along with the latter, to form tablets. In this case, the shaping depressions are provided in both or only in one of the rotating shaping elements. However, this method of production has the disadvantage that no specific adaptations of the material can be made without the individual doses becoming considerably misshapen, because here there are no lateral surrounding guides. Furthermore, it is necessary for the moldings obtained to undergo secondary finishing, in particular smoothing and flash removal. Furthermore, corrections of the mass are only possible on the moldings to a very limited extent, as a result of which it is not possible to change the format to produce heavier or lighter moldings.

The object of the present invention is to provide a device and a method for forming moldings from a moldable material with which the moldings can be produced quickly and efficiently. In particular, the proportion of moldable material that is fed in but not made into a molding is to be as small as possible.

This object is achieved by a device with the features of claim 1 and a method with the features of claim 14. Advantageous forms and developments are provided by the subclaims.

The device according to the invention is characterized by a displacement partition which can be moved toward the die grid for portioning the moldable material, the displacement partition comprising lateral limiting elements which correspond to the lateral limiting elements of the die grid. Consequently, in the case of the device according to the invention, the moldable material is pre-portioned by the displacement partition, with the excess material that is left on the die grid being displaced largely completely into the receiving spaces of the die grid and the die grid then forming a completely enclosed space around the individual lots of material, which can subsequently be compressed with corresponding settable volumes by the tools pressing downward in the die grid. In this way it is possible to produce moldings which have no peripheral flash and no distortion, so that there is no need for any further, secondary finishing. Furthermore, smooth surface structures and complicated geometries of the moldings can be realized.

The lateral limiting elements of the displacement partition are preferably in line with the lateral limiting elements of the die grid. The thickness of the lateral limiting elements of the die grid corresponds in particular to the thickness of the lateral limiting elements of the displacement partition.

According to a preferred configuration of the device according to the invention, the lateral limiting elements of the displacement partition and the lateral limiting elements of the die grid have end faces which at least partly meet when the displacement partition and the die grid are moved completely toward one another. In particular, the respective end faces have the same geometry. For example, the die grid may comprise a square, rectangular, rhomboidal or circular grid pattern. The same grid pattern is then formed by the lateral limiting elements of the displacement partition, so that the end faces respectively match one another.

According to a development of the device according to the invention, the transition from the end faces to the lateral limiting elements of the die grid and/or of the displacement partition are rounded or beveled. As a result, the displacement of the materials when the displacement partition is lowered is made easier and the direction of the material to be displaced is predetermined in the direction of the receiving spaces of the die grid, whereby the amount of scrap from the materials to be molded is reduced to virtually nothing.

According to a configuration of the device according to the invention, the tool can be guided into the receiving space by the lateral limiting elements of the displacement partition. The displacement partition can consequently perform a dual function. On the one hand, it serves for the portioning of the moldable material. On the other hand, it serves as a guide for the tool.

According to a development of the device according to the invention, a further tool on the die side for the at least one receiving space can be guided into the receiving space from the opposite side of the tool on the displacement side. In this way, the moldable material in this receiving space can be compressed from two sides.

In particular, a multiplicity of receiving spaces are formed in the die grid and are respectively assigned a tool on the displacement partition side and a tool on the die side. In this case, the tools on the displacement partition side and/or the tools on the die side may each be mounted in a tool carrier. They are, in particular, secured in the tool carrier in a floating manner.

The tools may, in particular, be coolable and/or heatable for specific moldable materials.

According to a preferred development of the device according to the invention, the displacement partition is coupled with the tool carrier for the tools on the displacement partition side. In this case, the displacement partition is, in particular, movable with respect to the tool carrier against the force of at least one spring.

According to a preferred development of the device according to the invention, at least one tool carrier is movable along a guideway, which has a molding portion in which a constant pressure is exerted over a section of the way by the tools on the portions of moldable material that are located in the receiving spaces. In particular, the molding portion of the guideway runs in a straight line. This configuration allows the device according to the invention to be used in particular for molding materials which require a long holding pressure time. This is so because the maximum pressure of the tools can be exerted over the entire section of the molding portion of the guideway. Depending on the speed at which the tool carrier moves on the guideway, this molding portion may be chosen to be long enough for any desired holding pressure times to be realized. The dwell time of the material in the portion in which it is compressed can consequently be set.

The tool carrier is held in the guideway in particular by way of a slotted guide. Furthermore, a separate guideway may be provided for the tool carrier of the tools on the displacement partition side and for the tool carrier of the tools on the die side.

According to a development of the device according to the invention, at least one tool carrier runs along the guideway on guide rollers, at least in certain portions, the guide rollers being adjustable with respect to their distance from the tool carrier of the tools on the displacement partition side, at least in the molding portion of the guideway. As a result, a molding pressure can be set according to the properties of the material to be molded. The volumes to be set of the different materials to be compressed are set by means of the height adjustable die grid. In the case of the method according to the invention, consequently, an online change of the forms of administration with regard to the dosage can be realized. Furthermore, it is possible to compensate for tolerances of the guideway in the molding portion.

In the case of the device according to the invention, a cooling portion of the guideway, in which the compressed moldings in the die grid cool down, may be formed downstream of the molding portion in the direction of processing. In particular in the case of pharmaceutical moldings, it is often necessary for long cooling-down times to be realized, in order to counteract any residual stresses in the moldings.

A sampling station for removing one or more moldings, which may be passed on for quality control, may be arranged downstream of the molding portion or downstream of the cooling portion. Following that there may be arranged a removal and camera inspection station for removing and examining the moldings, a cleaning station for at least the tools, the displacement partition and the die grid and, finally, a molding space coating device, in which the parts of the device which come into contact with the moldable material are coated to avoid adhesive attachments.

The tool cleaning and the molding space coating can consequently be carried out continuously while the production process is in progress. Furthermore, an online inspection and online mass correction of the moldings is possible while the production process is in progress. Furthermore, an online 100% visual inspection by means of a camera and online NIR for various analytical data acquisitions are possible.

On account of the molding space coating and the settable cooling-down time, moldings with complicated geometries can also be demolded well when carrying out thermal processes.

According to a preferred form of the device according to the invention, the tool carrier is coupled with a rotatable drive unit by way of a telescopic arm, so that the tool carrier can be guided over a closed curve. The drive unit may be the only driven unit of the device according to the invention. A telescopic arm is preferably provided for the tool carrier of the tools on the displacement side and for the tool carrier of the tools on the die side. The telescopic arm or telescopic arms may be pivotably mounted, in particular about a tangential axis with regard to the rotation of the drive unit. Furthermore, the length of the telescopic arm is variable. The tool carrier is in this case coupled with the telescopic arm by way of a horizontal/vertical fork joint. In this way, the tool carrier can on the one hand be moved along the guideway radially toward the drive unit and radially away from the drive unit. On the other hand, the tool carrier can be pivoted upward and downward with a horizontal pivoting plane.

The moldable material may be, in particular, a ribbon of melt. To form the ribbon of melt, the device comprises in particular an extruder, it being possible for the ribbon of melt to be fed continuously to the die grid. A molding device for smoothing and aligning a strand of melt discharged by the extruder to form the ribbon of melt is preferably arranged between the extruder and the die grid. In this way, the width of the ribbon of melt can be formed such that it corresponds to the width of the die grid. As a result, the thickness of the ribbon of melt can be set such that the weight of the individual portions of the material is set.

If required, the ribbon of melt may comprise a number of layers of different compositions. The extruder may, in particular, be designed for two-component or three-component extrusion, it being possible for the different components to lie against one another in different sequences. For example, films and moldings with a product sequence ABA or ABCBA can be formed. Such product sequences may be used for the production of medical products, for example in the production of lingual and sublingual films/tablets and transdermal plasters. Such products can be easily produced on the device according to the invention.

Equally, applications from the food industry can be realized by means of coextrusion. In this case, softer elements of moldings, for example confections, can be superposed with layers which have a more viscous consistency in various product sequences, in order in this way to allow previously poorly processable foods to be handled and confected better. Furthermore, a number of layers of extremely varied flavored melts may be produced to form a confection.

Furthermore, the formable material may be a bulk material. The device according to the invention may, in particular, compress highly resilient polymer granules to form moldings. The settable molding time for the molding operation means that the device according to the invention can preferably be used for processing flowable and moldable powdered bulk materials, for example in the pharmaceutical, food, cosmetics and hygiene industries.

In the case of the method according to the invention for forming moldings, a moldable material is formed and fed to a die grid, so that it rests on the end faces of lateral limiting elements of the die grid. A displacement partition with lateral limiting elements which correspond to the lateral limiting elements of the die grid is then moved toward the die grid, whereby the part of the moldable material that is resting on the lateral limiting elements of the die grid is displaced in the direction of a receiving space formed by the die grid between the lateral limiting elements, so that the moldable material is portioned. At least one tool then compresses the portions of the moldable material in the receiving space.

In particular, the moldable material is fed to the die grid continuously. In particular, the displacement partition is moved toward the die grid in such a way that the lateral limiting elements of the displacement partition are in line with the lateral limiting elements of the die grid. In this case, the displacement partition is moved toward the die grid until the end faces of the lateral limiting elements of the displacement partition lie at least partly against the end faces of the lateral limiting elements of the die grid. The displacement partition may, in particular, be moved toward the die grid against the force of at least one spring.

In the case of a refinement of the method according to the invention, during compressing, the tool is guided into the receiving space by the lateral limiting elements of the displacement partition. Furthermore, during compressing, a further tool on the die side for the at least one receiving space is preferably guided into the receiving space from the opposite side of the tool on the displacement partition side.

In particular, a multiplicity of receiving spaces may be formed in the die grid. During compressing, a pressure is exerted on the moldable material in each receiving space by a tool on the displacement partition side and a tool on the die side.

The tools on the displacement partition side and/or the tools on the die side are, in particular, each mounted in a tool carrier. According to a preferred development of the method according to the invention, at least one tool carrier is moved along a guideway, which has a molding portion in which a constant pressure is exerted over a section of the way by the tools on the portions of moldable material that are located in the receiving spaces.

The tool carrier is coupled with a drive unit, in particular by way of a telescopic arm. It is moved by means of this drive unit, so that the tool carrier is guided on the guideway over a closed curve.

For the purposes of the invention, a moldable material is understood as meaning any material which changes its shape under the effects of a force. In particular, a strand of melt, which is continuously fed to the die grid, is formed as the moldable material. Before it is fed to the die grid, the strand of melt is preferably smoothed and aligned. Furthermore, powdered bulk materials may be fed to the die grid as moldable material.

When the device according to the invention or the method according to the invention is used in the pharmaceutical industry for producing moldings containing active substances, it is possible, for example, for the following application features to be realized: sensitive active substances can be shielded by so-called protective extrusion, a molding or a multilayer tablet which has faster release of the active substance of the outer layer and delayed release of the active substance of the inner layer can be realized by multilayer extrusion, multicomponent active substance emission and cascade-like active substance release can be realized, and various release profiles can be realized by different variations of the thickness of the individual layers. In particular, it is thereby possible for multilayer moldings for the food, cosmetics and hygiene industries to be produced well.

Figure 2:
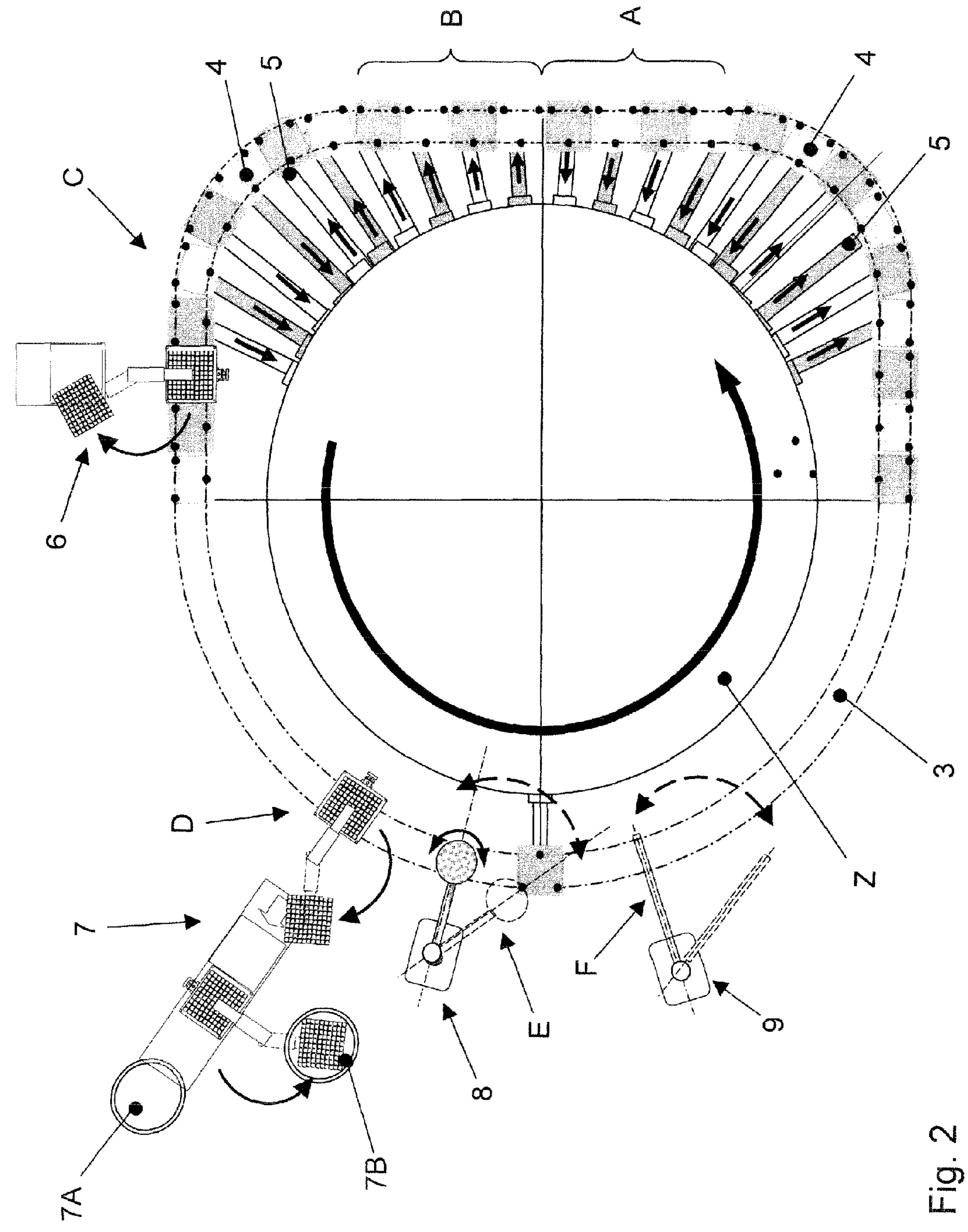
Figure 3:
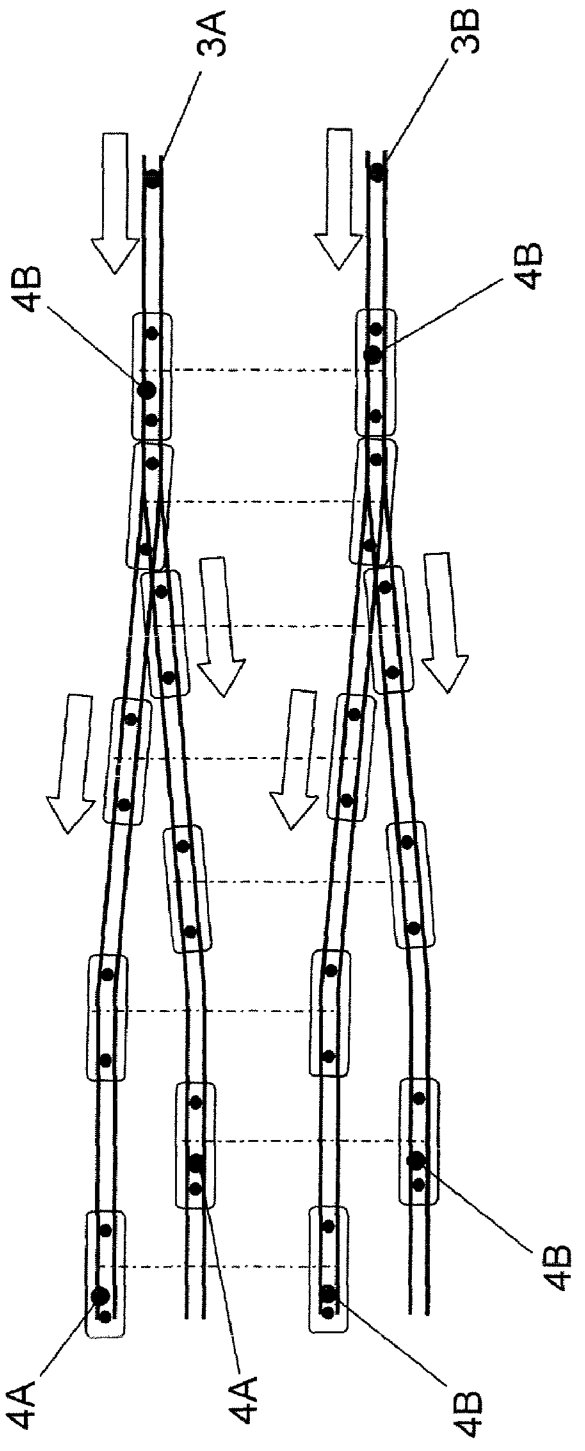
Figure 4:
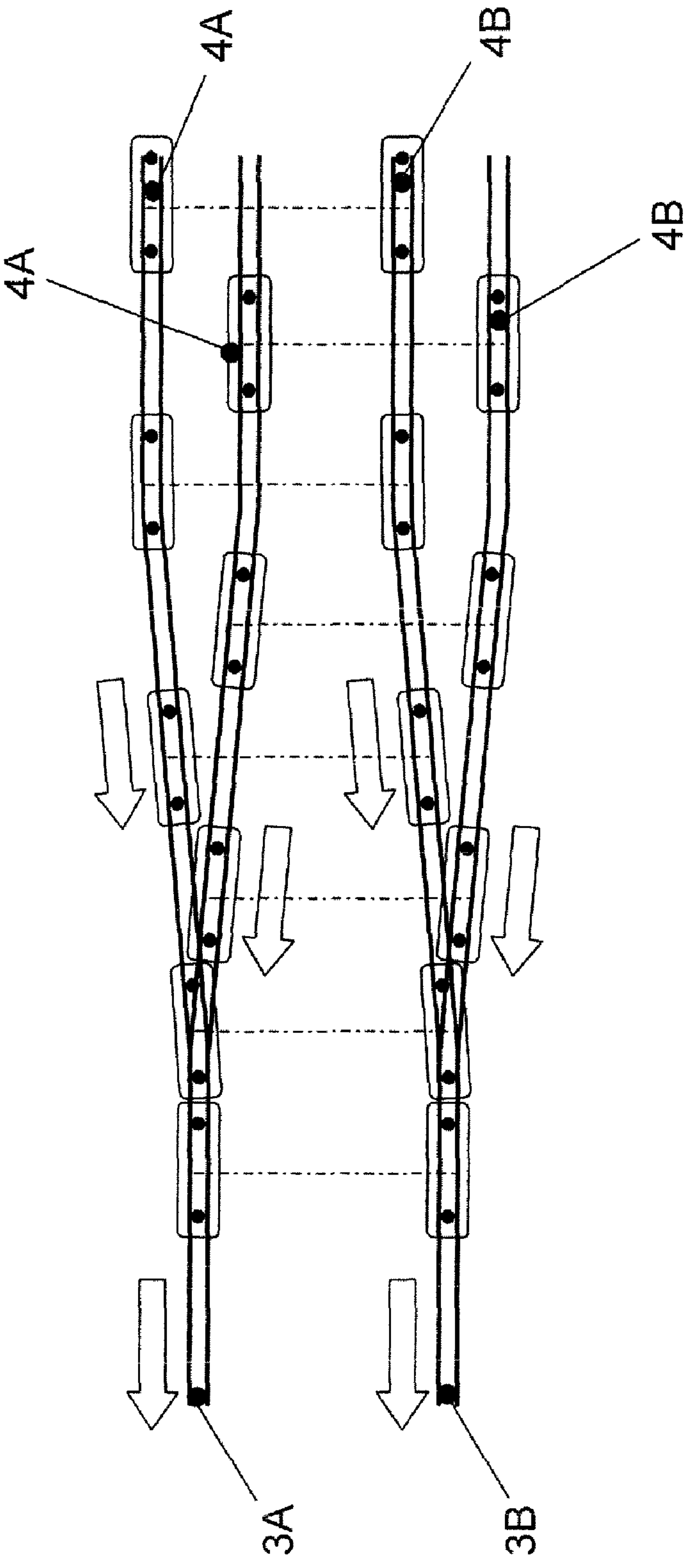
Figure 5:
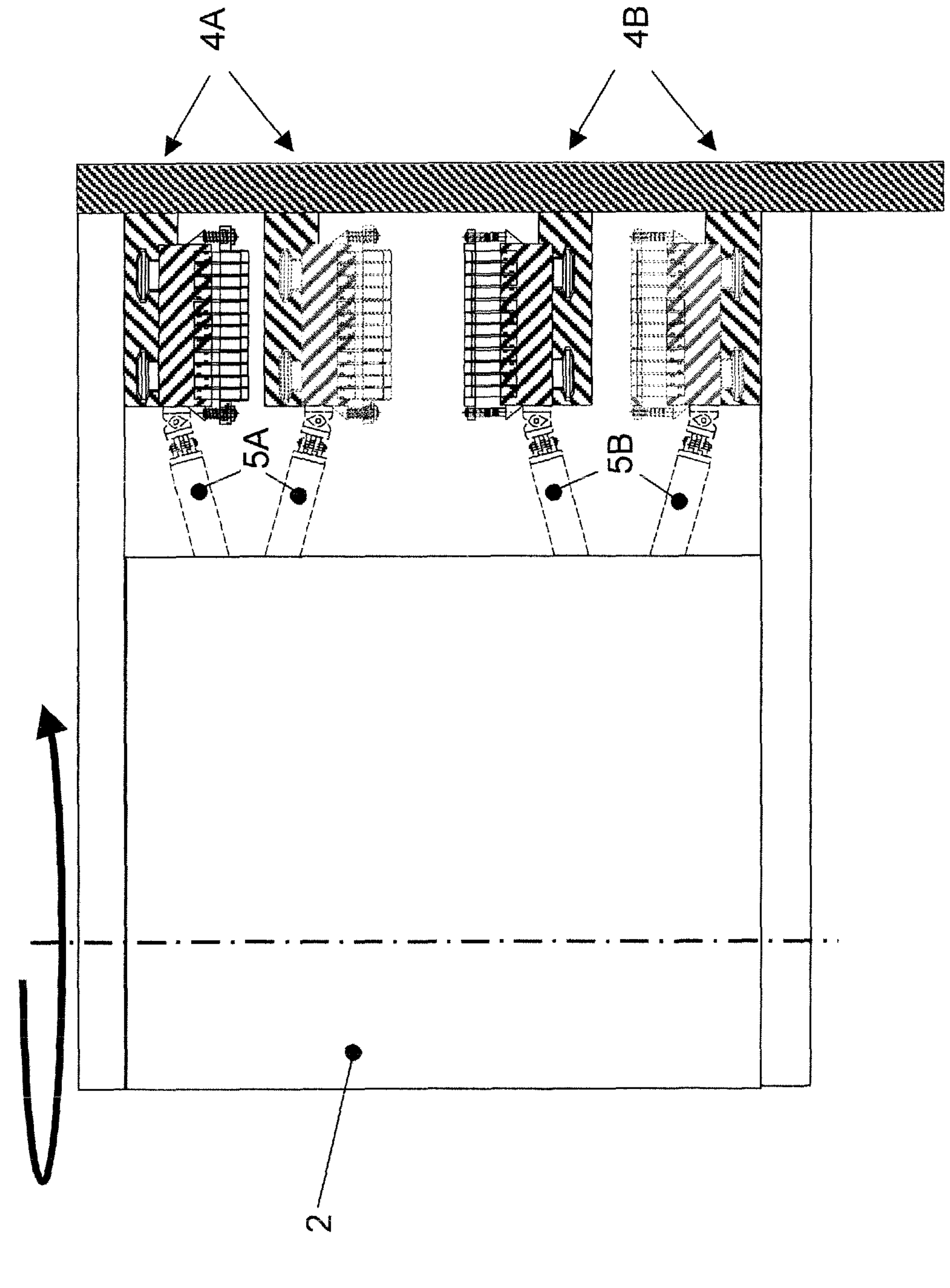
Figure 6B:
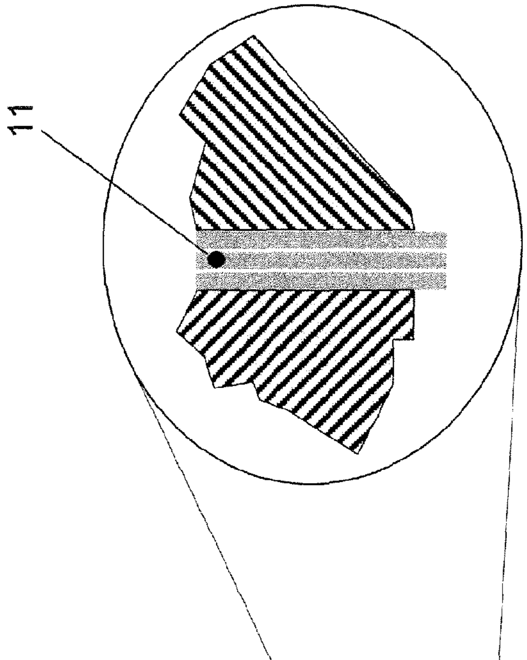
Figure 6A:
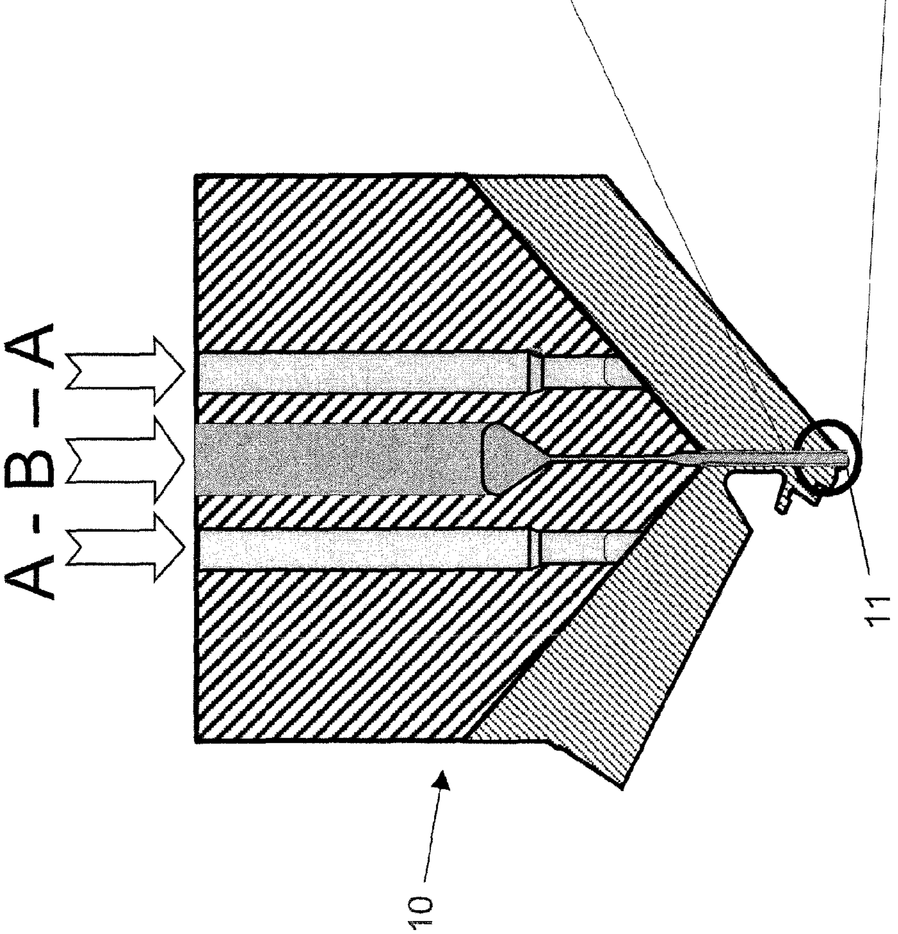
Figures 7A, 7B:
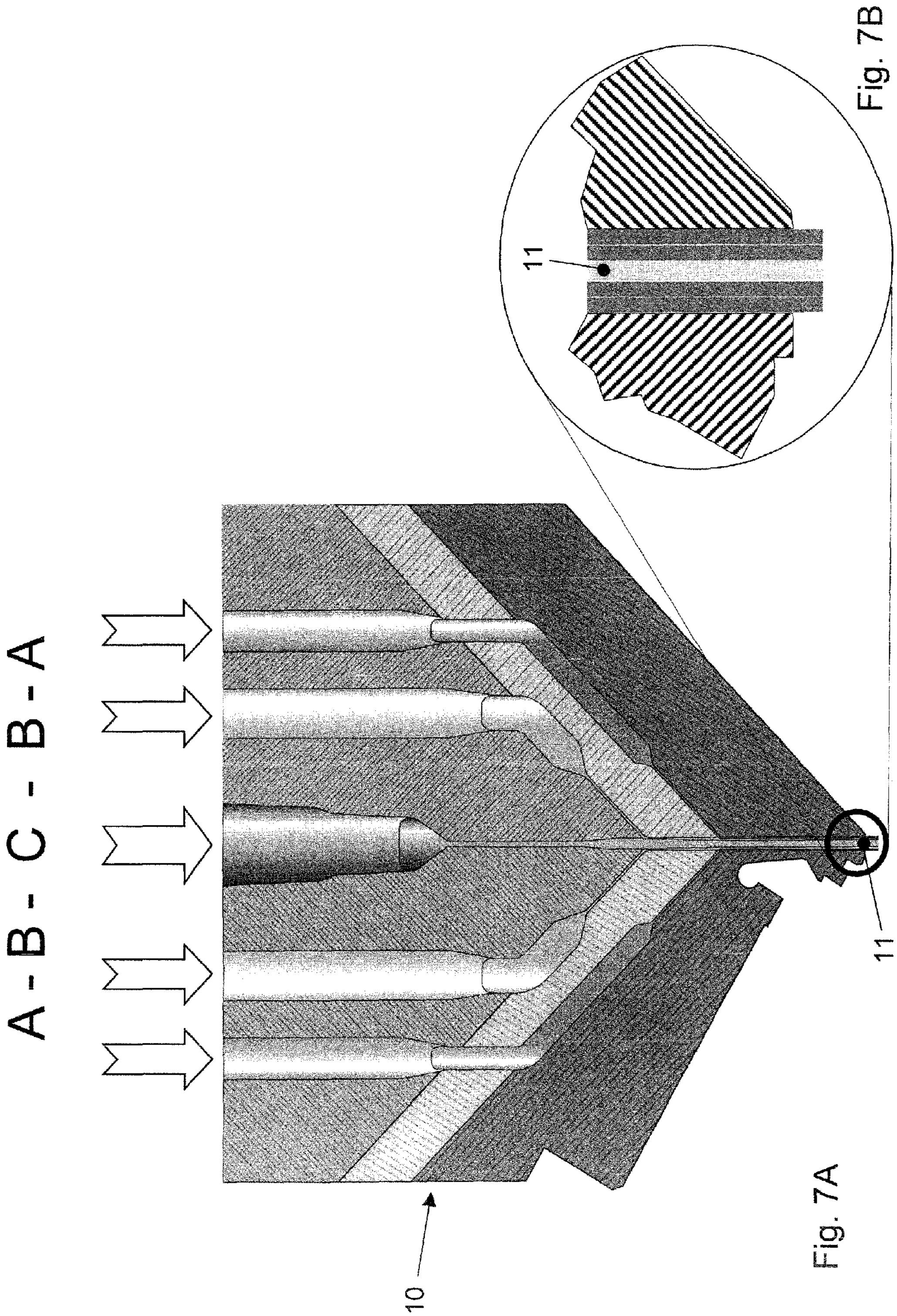
Figure 8A:
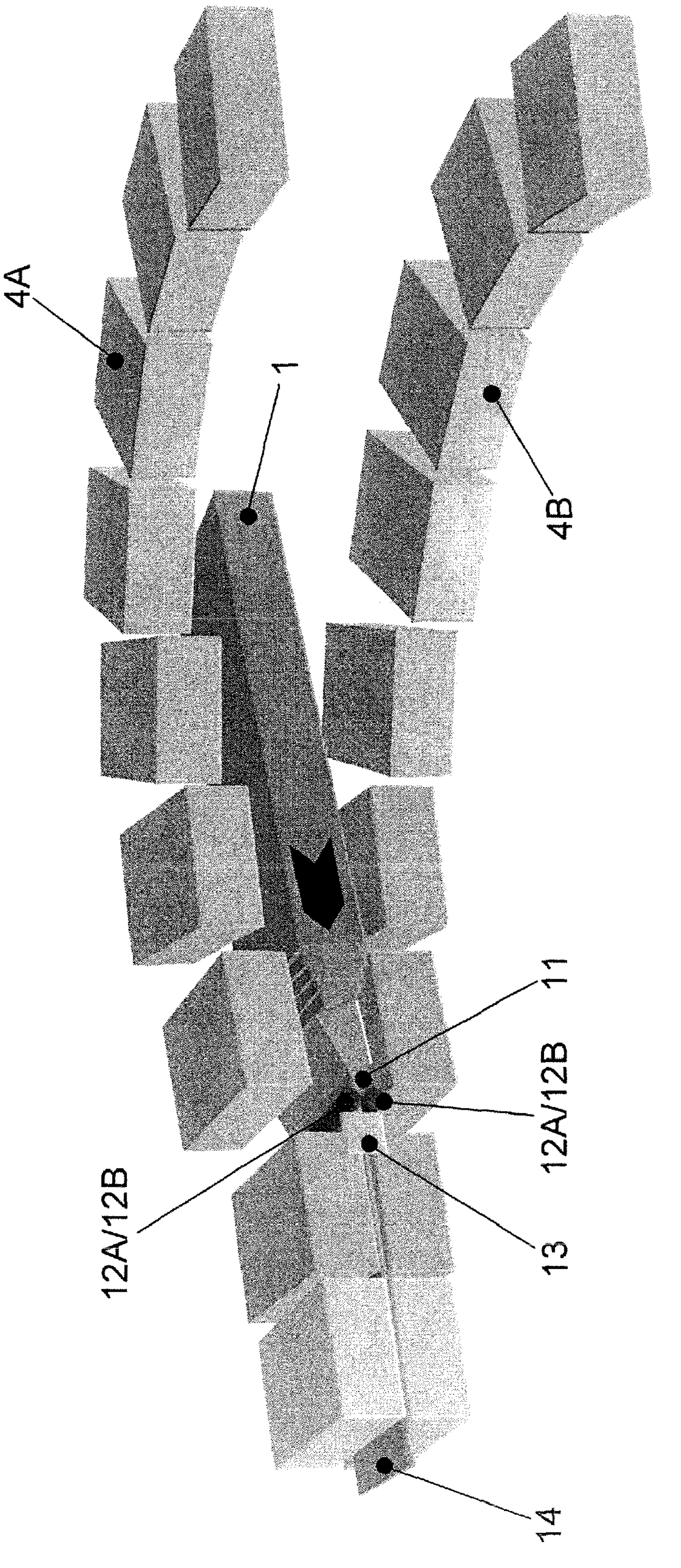
Figure 8C:
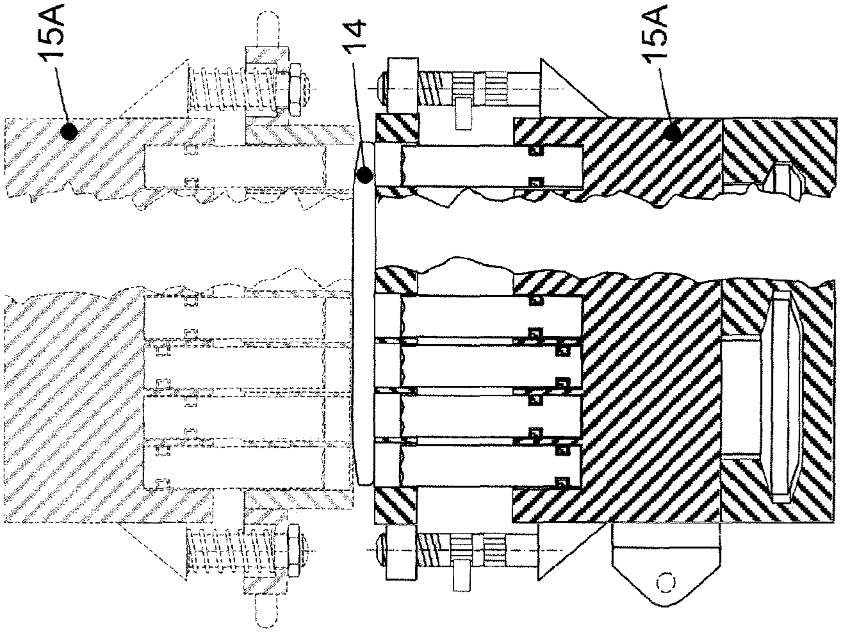
Figure 8B:
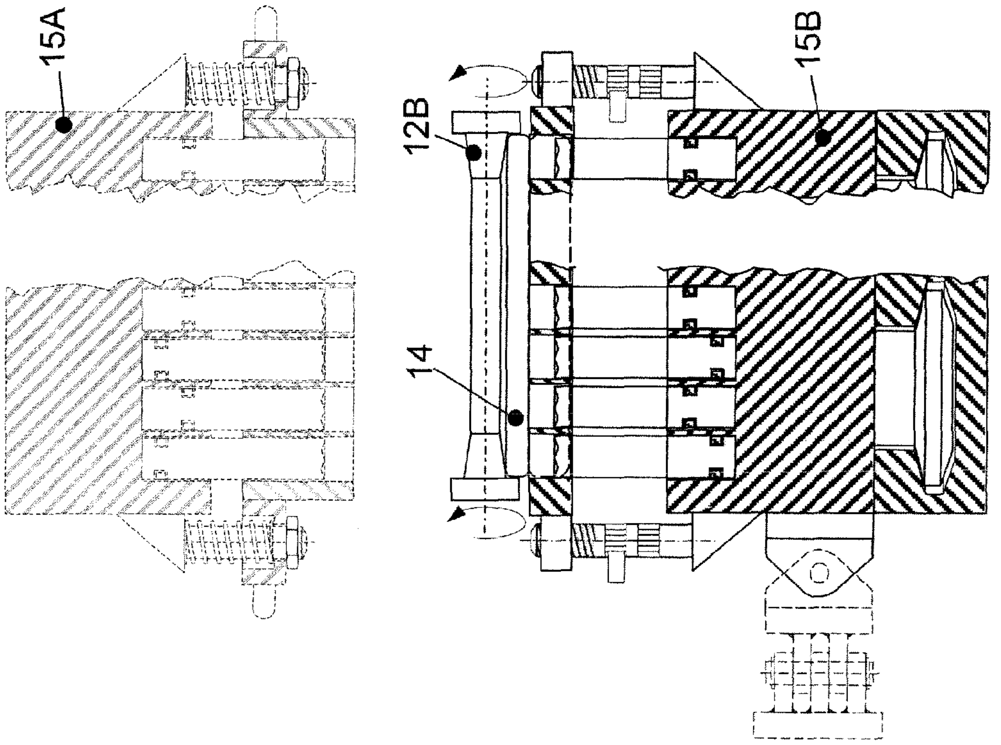
Figure 8D:
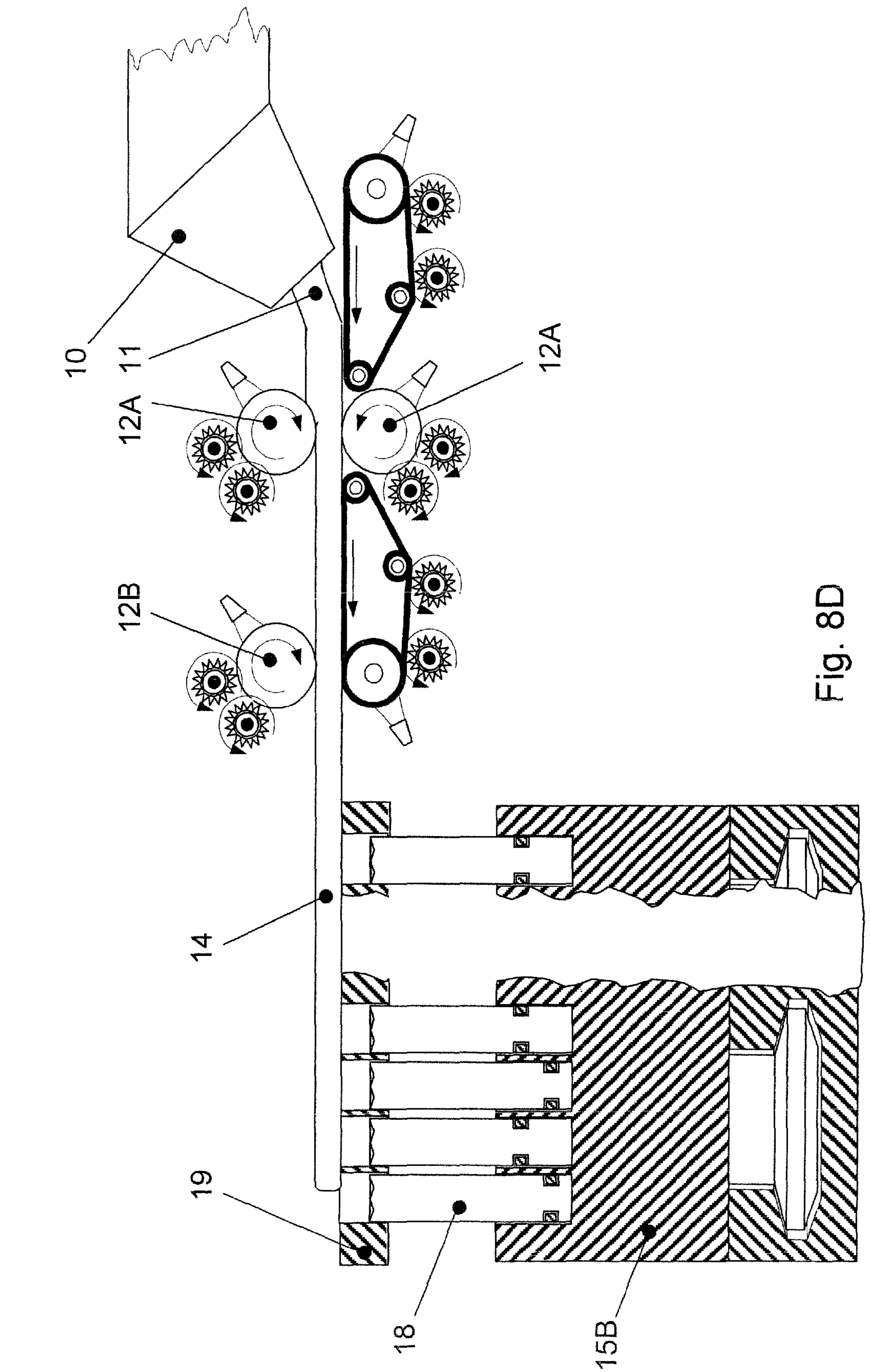
Figure 9:
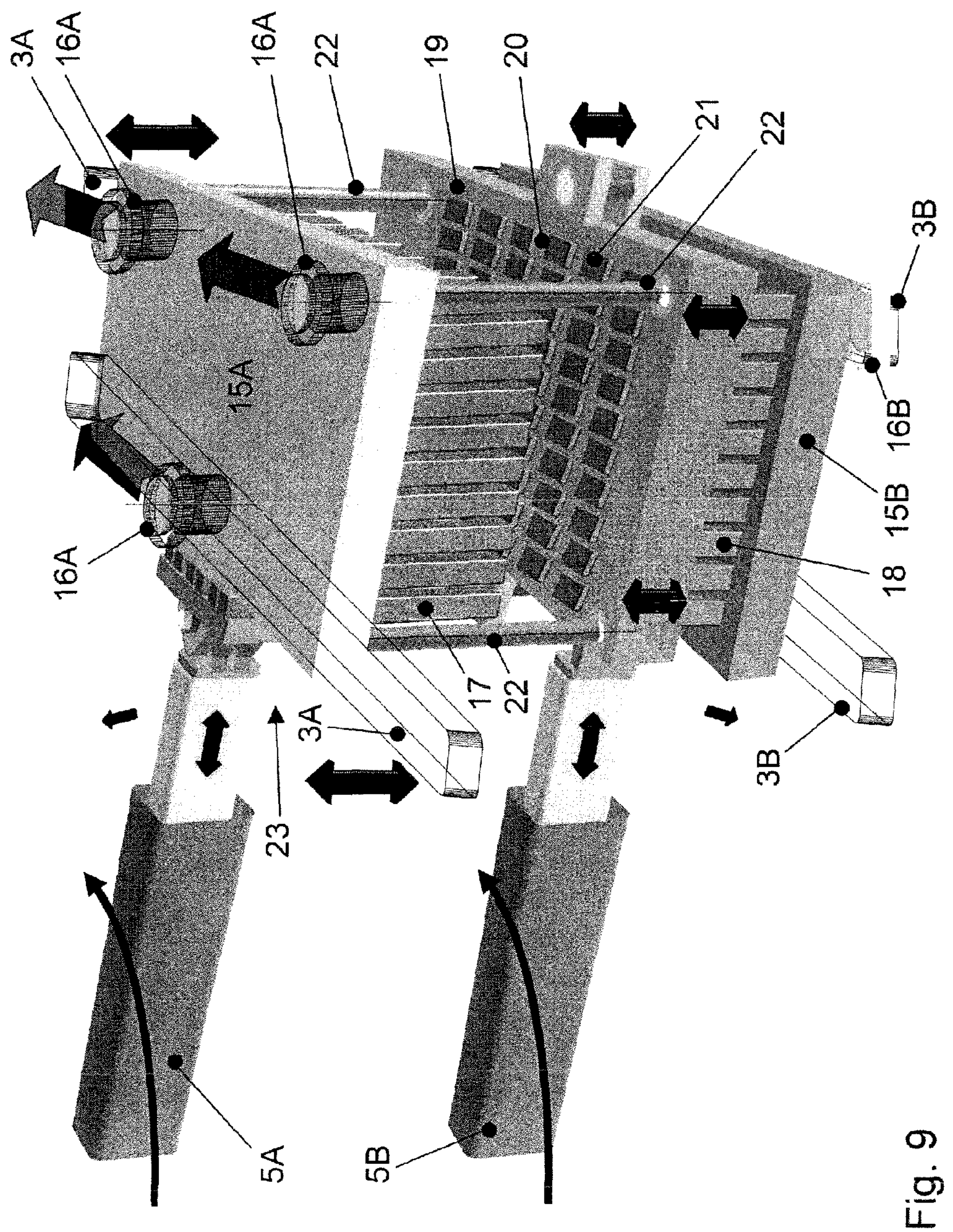
Figure 10:
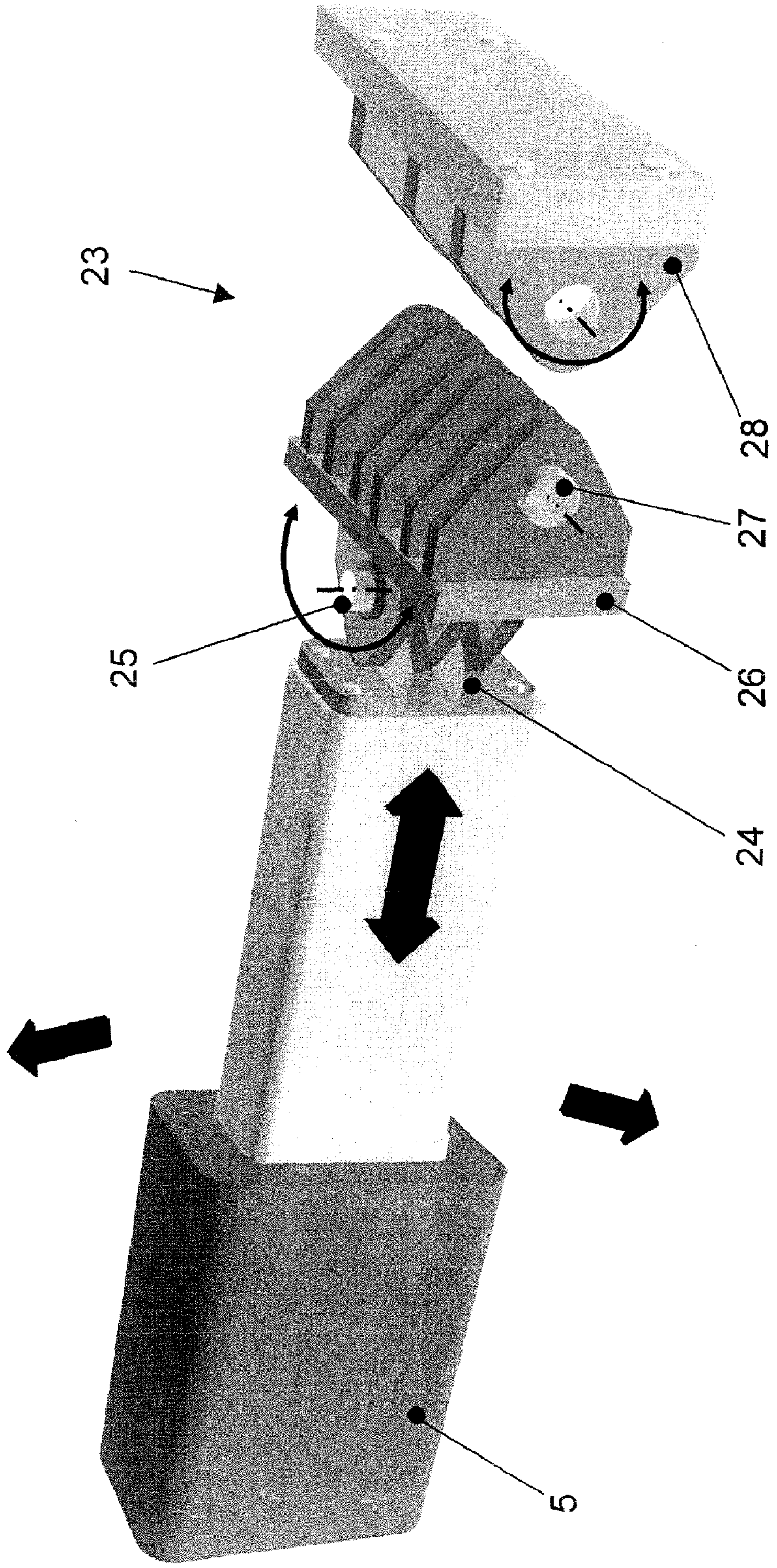
Figure 11:
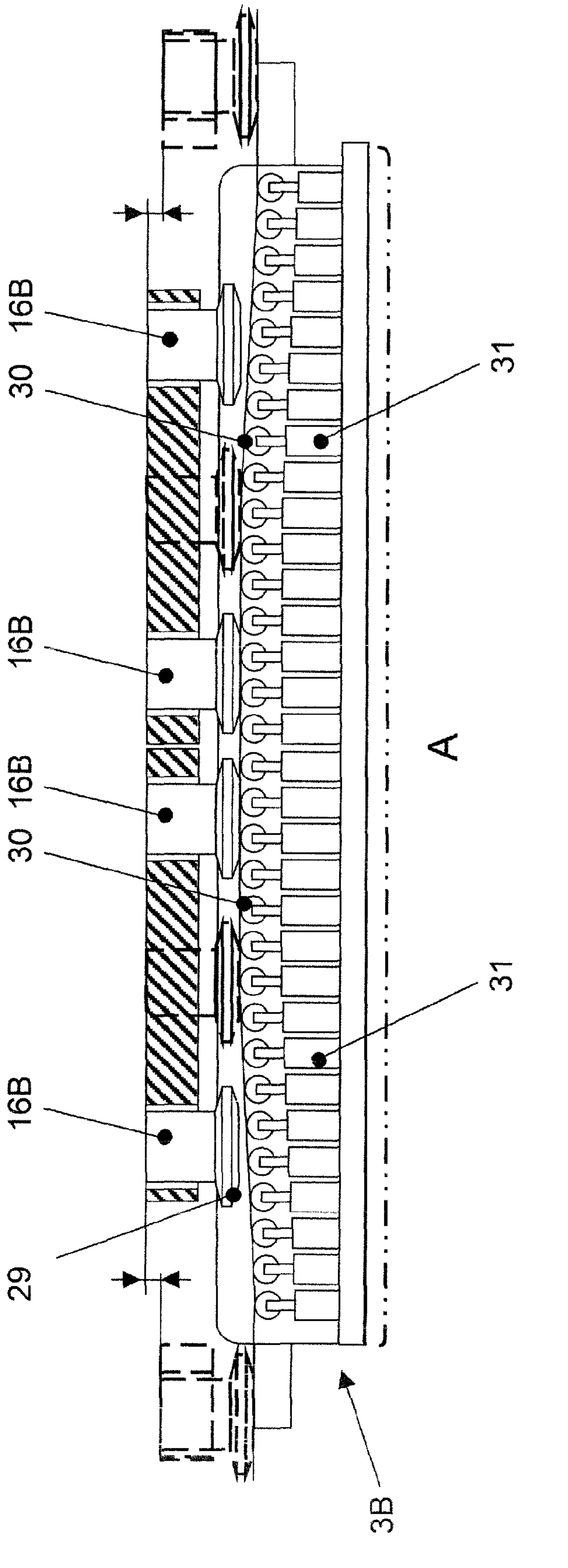
Figure 12:
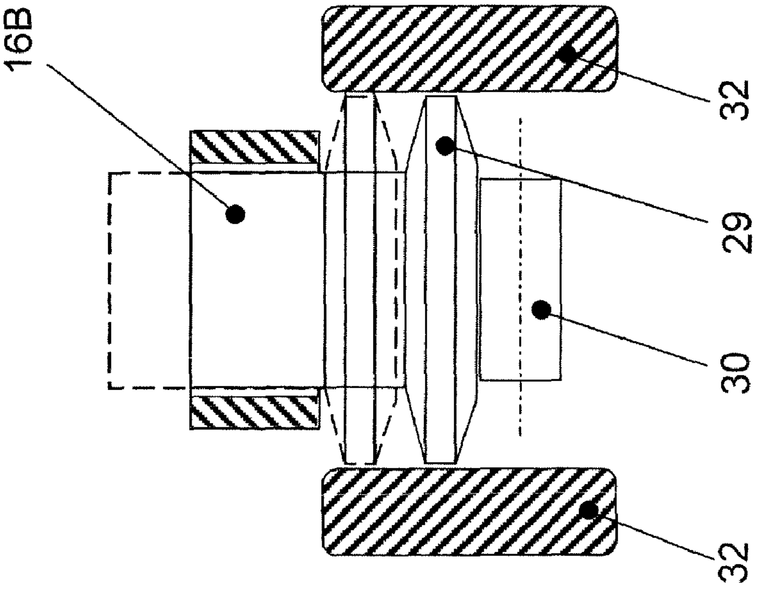
Figure 13:
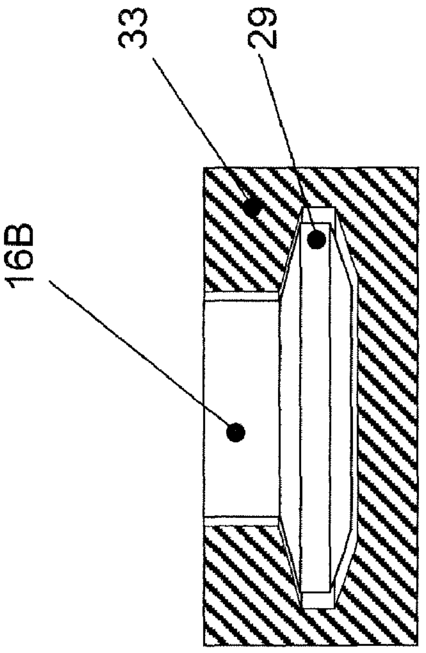
Figure 16A:
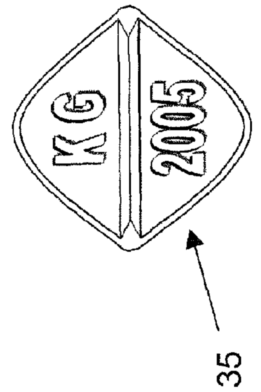
Figure 16B:
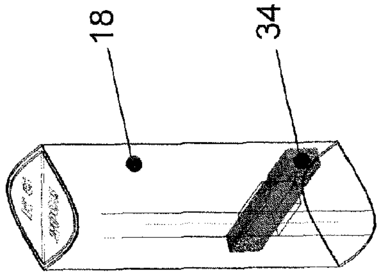
Figure 15A:
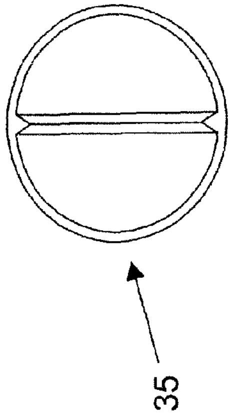
Figure 15B:
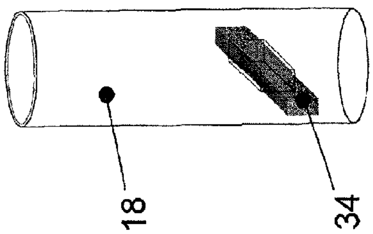
Figure 14A:
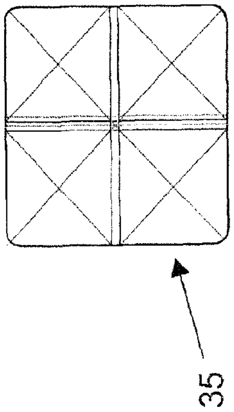
Figure 14C:
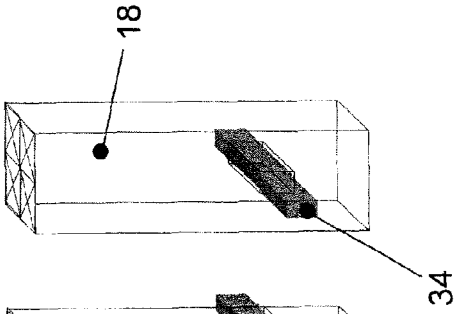
Figure 14B:
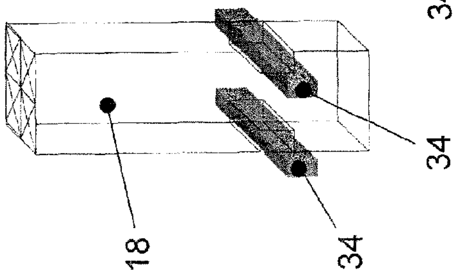
Figure 17:
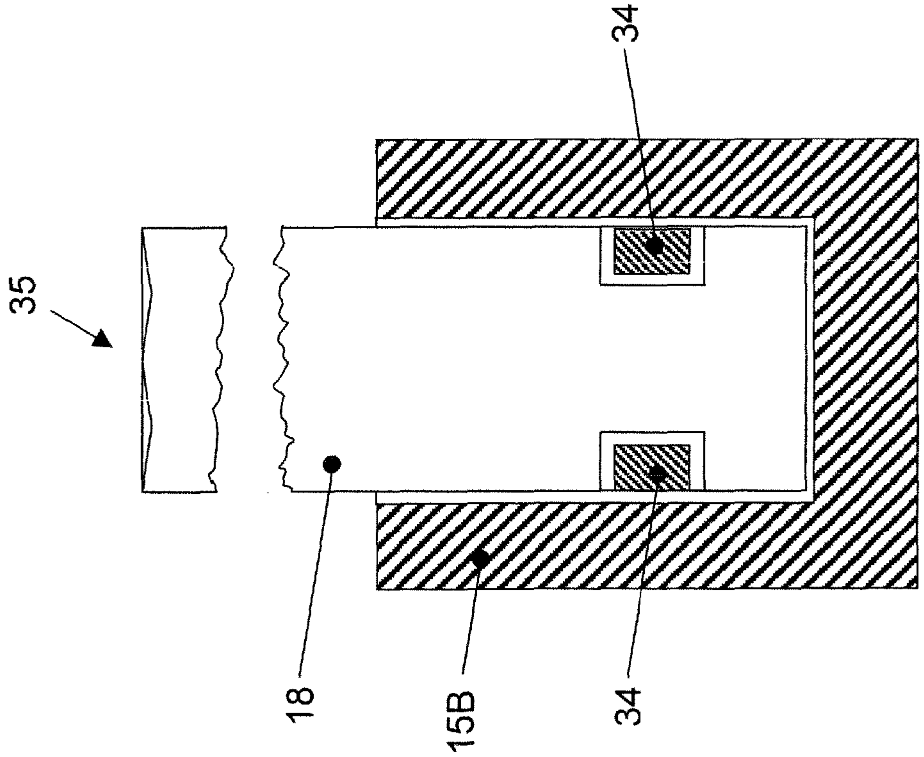
Figures 18, 19:
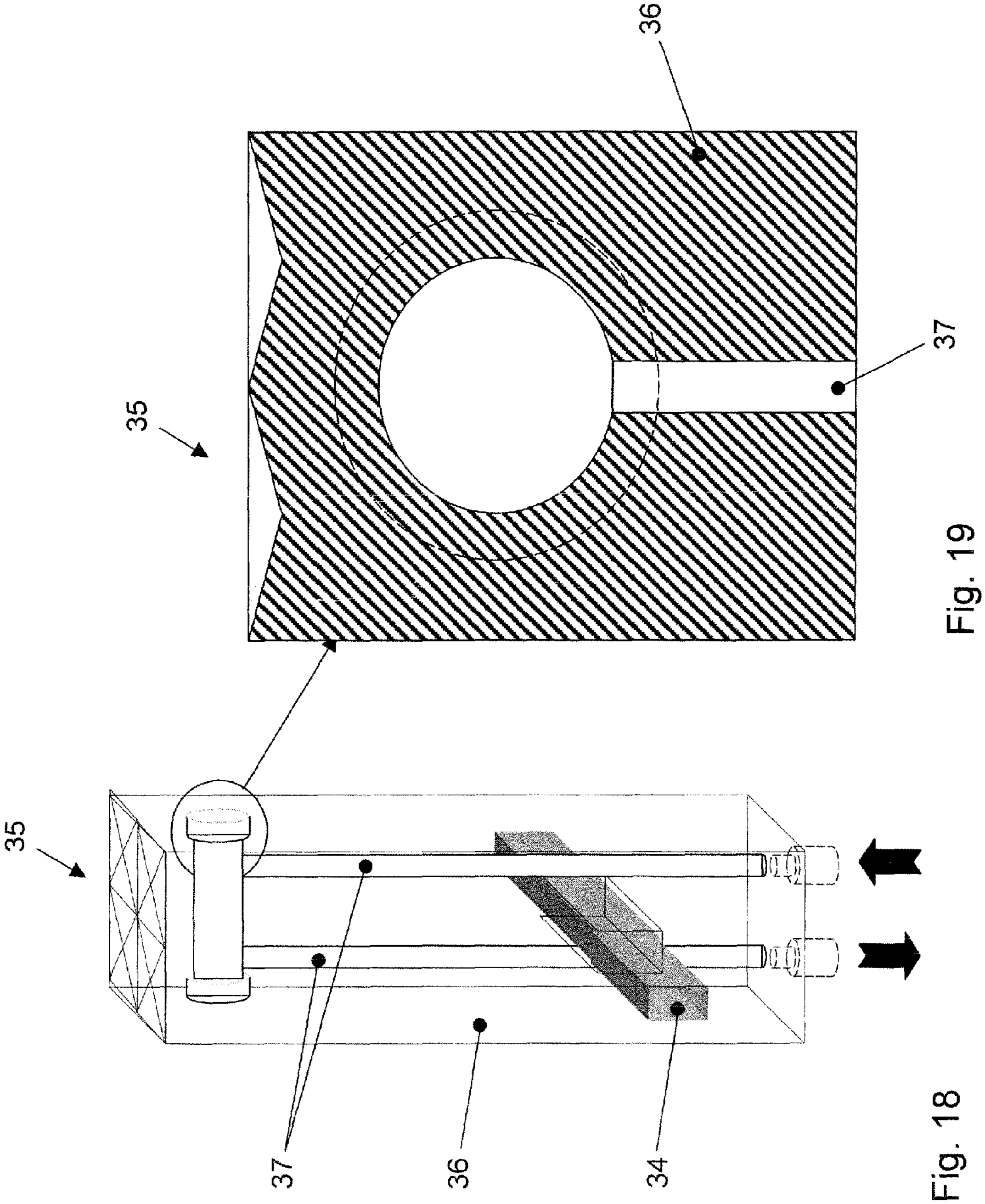
Figure 20:
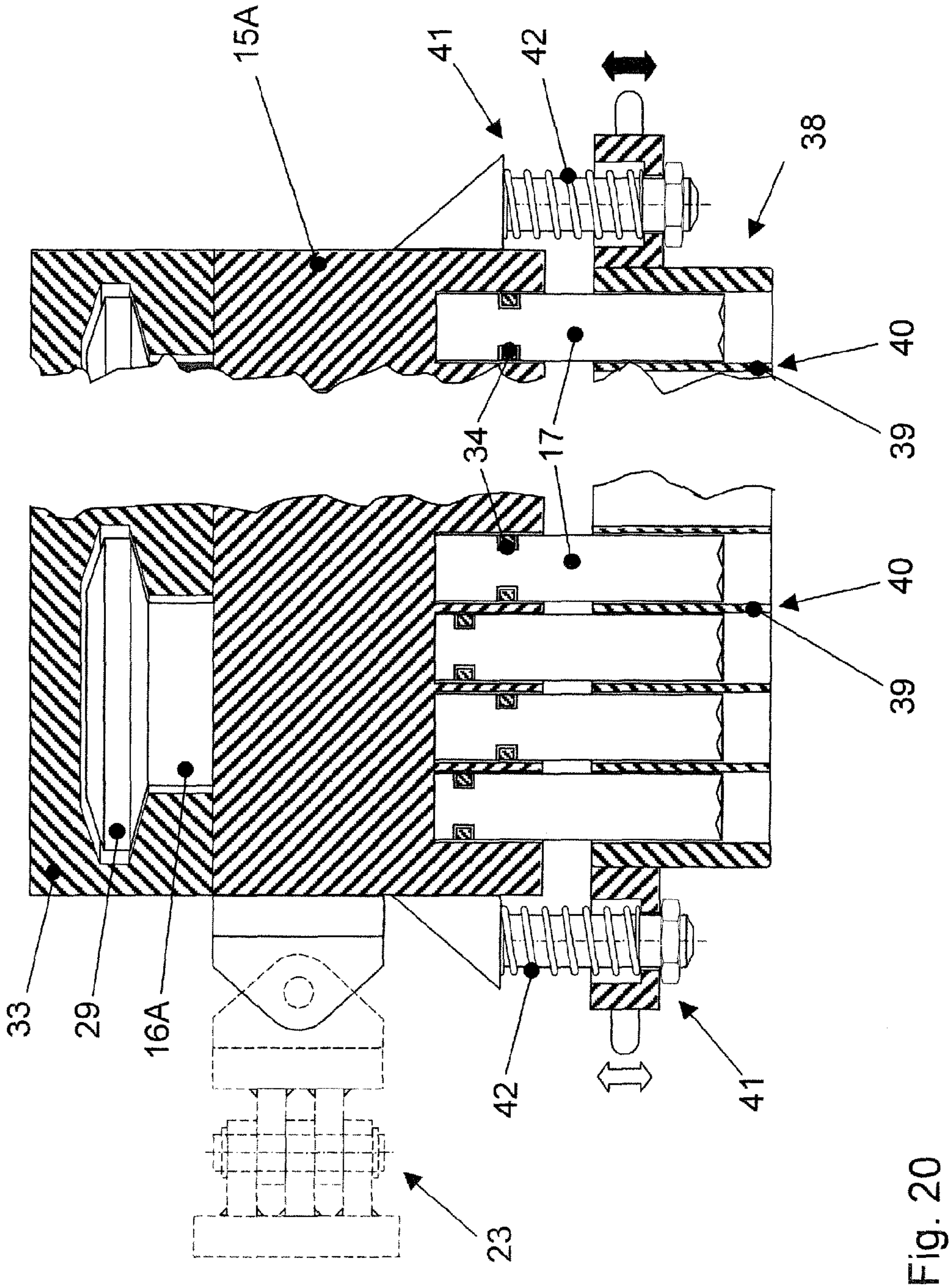
Figure 21:
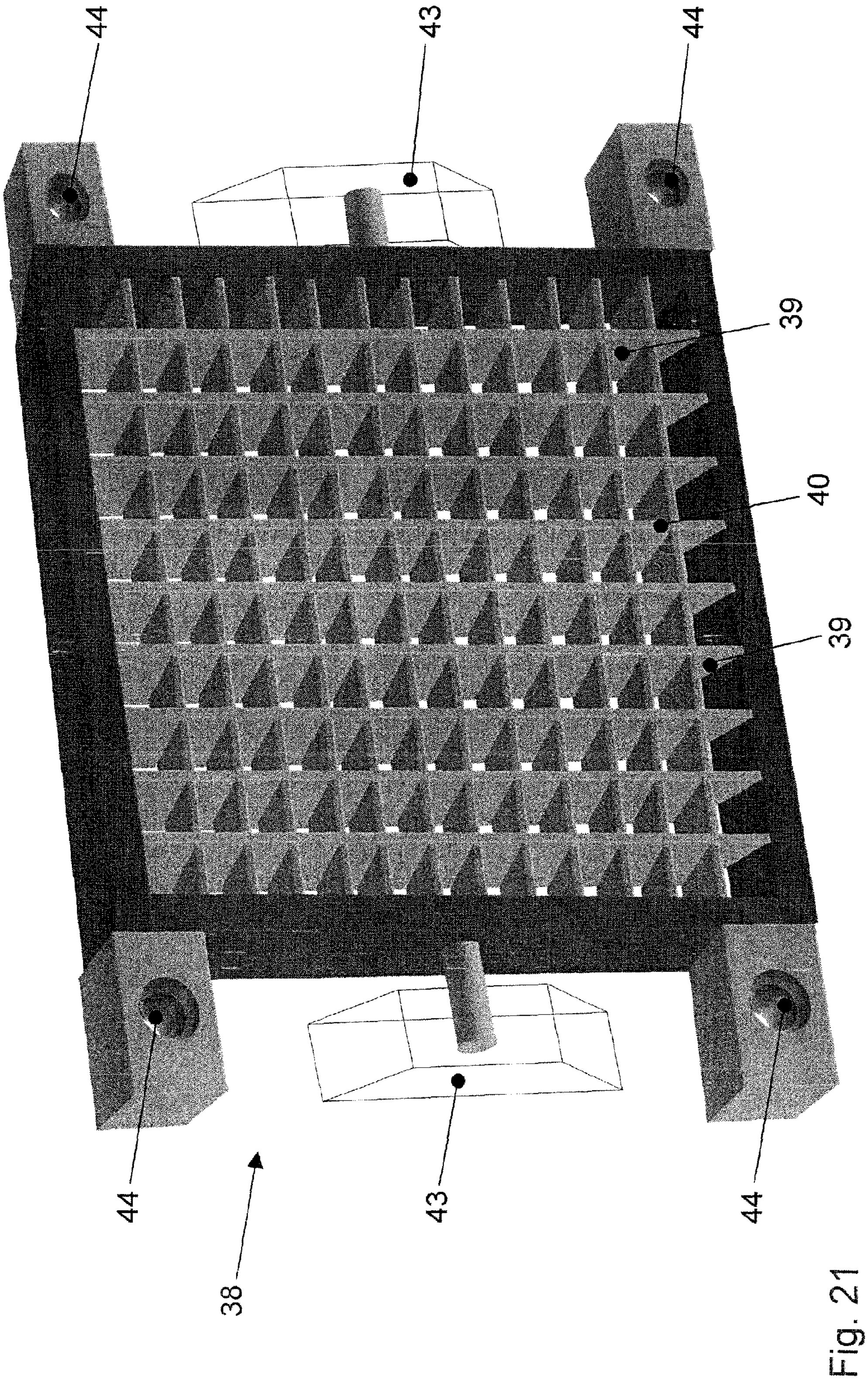
Figure 22:
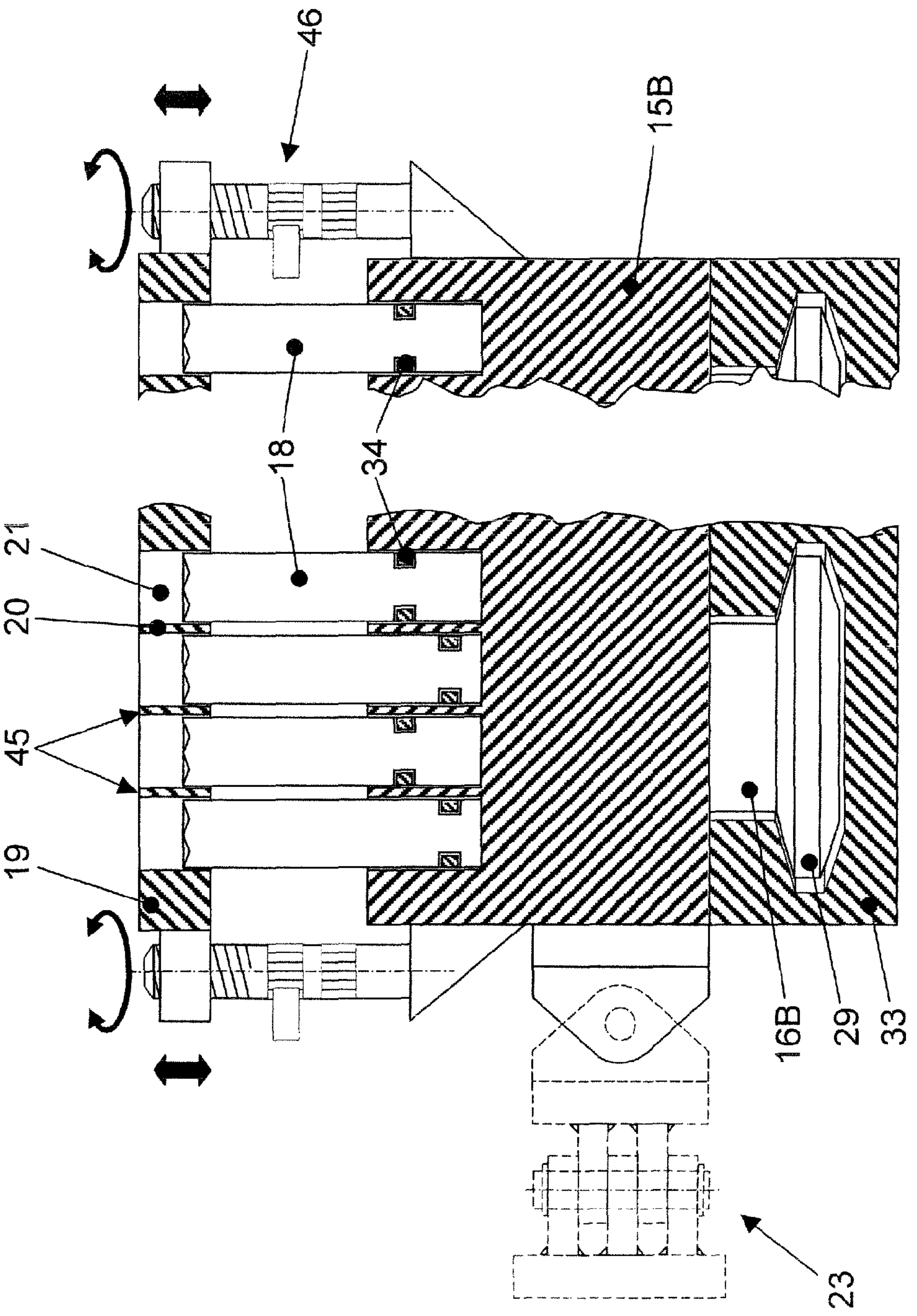
Figure 23:
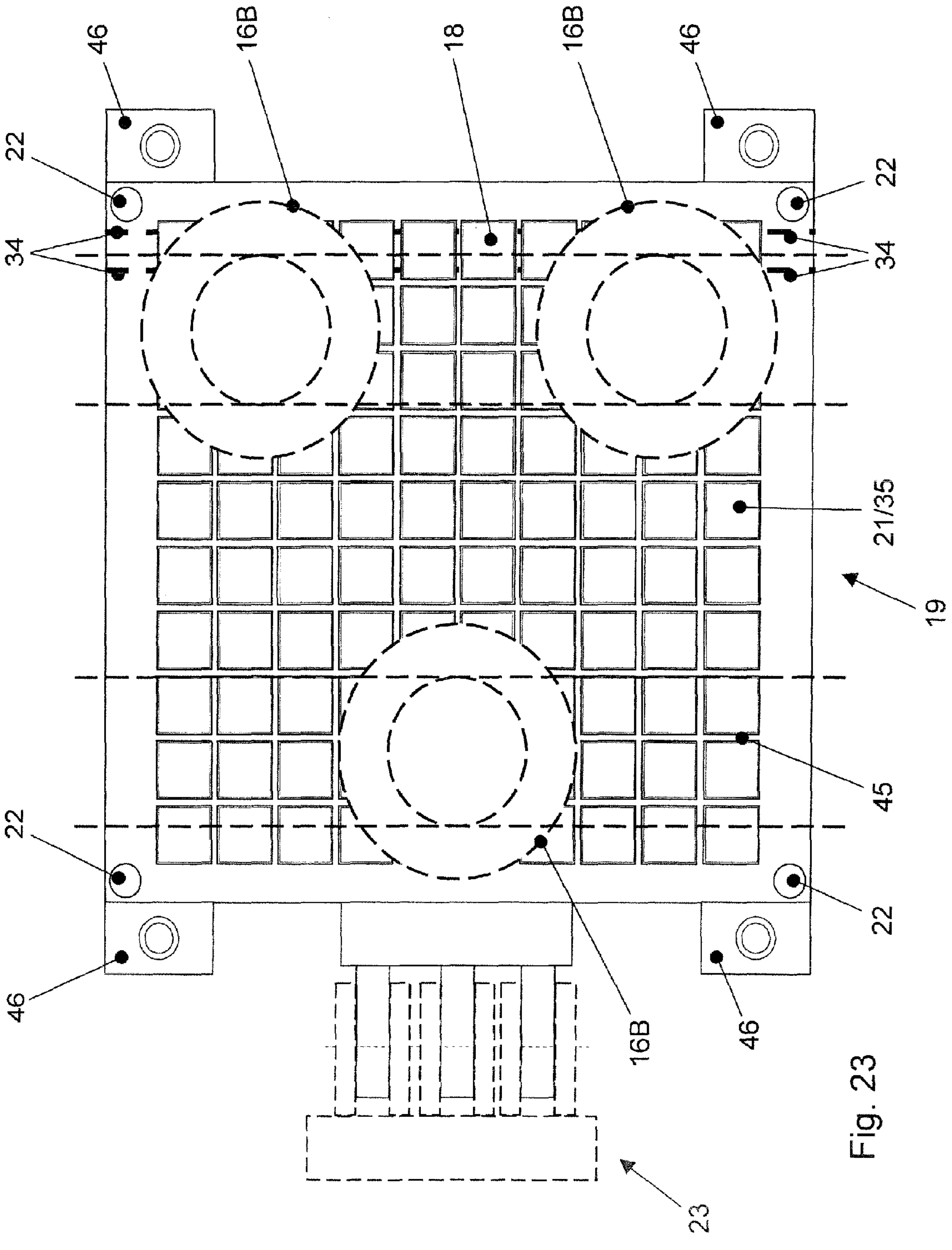
Figure 24A:
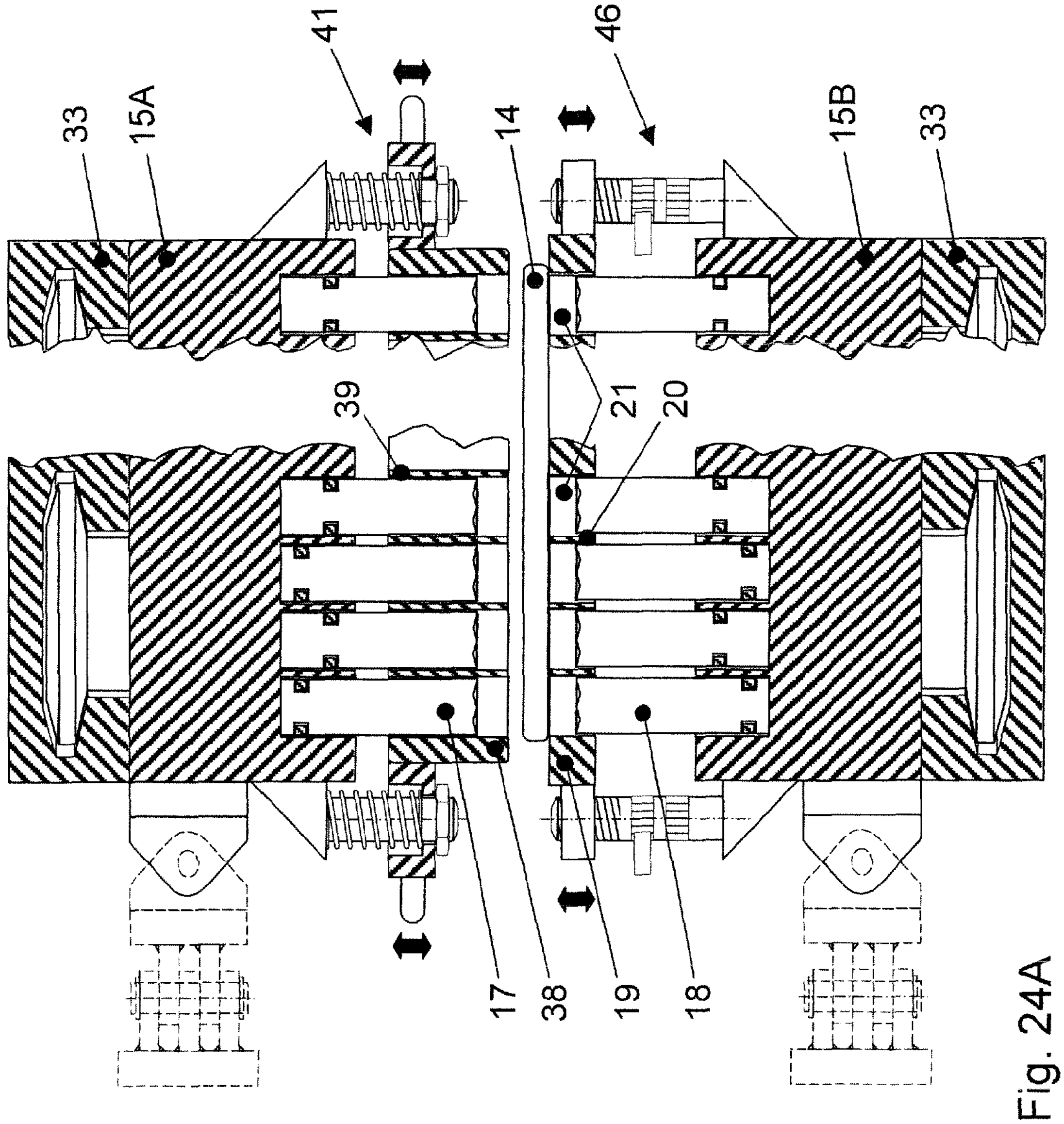
Figure 24B:
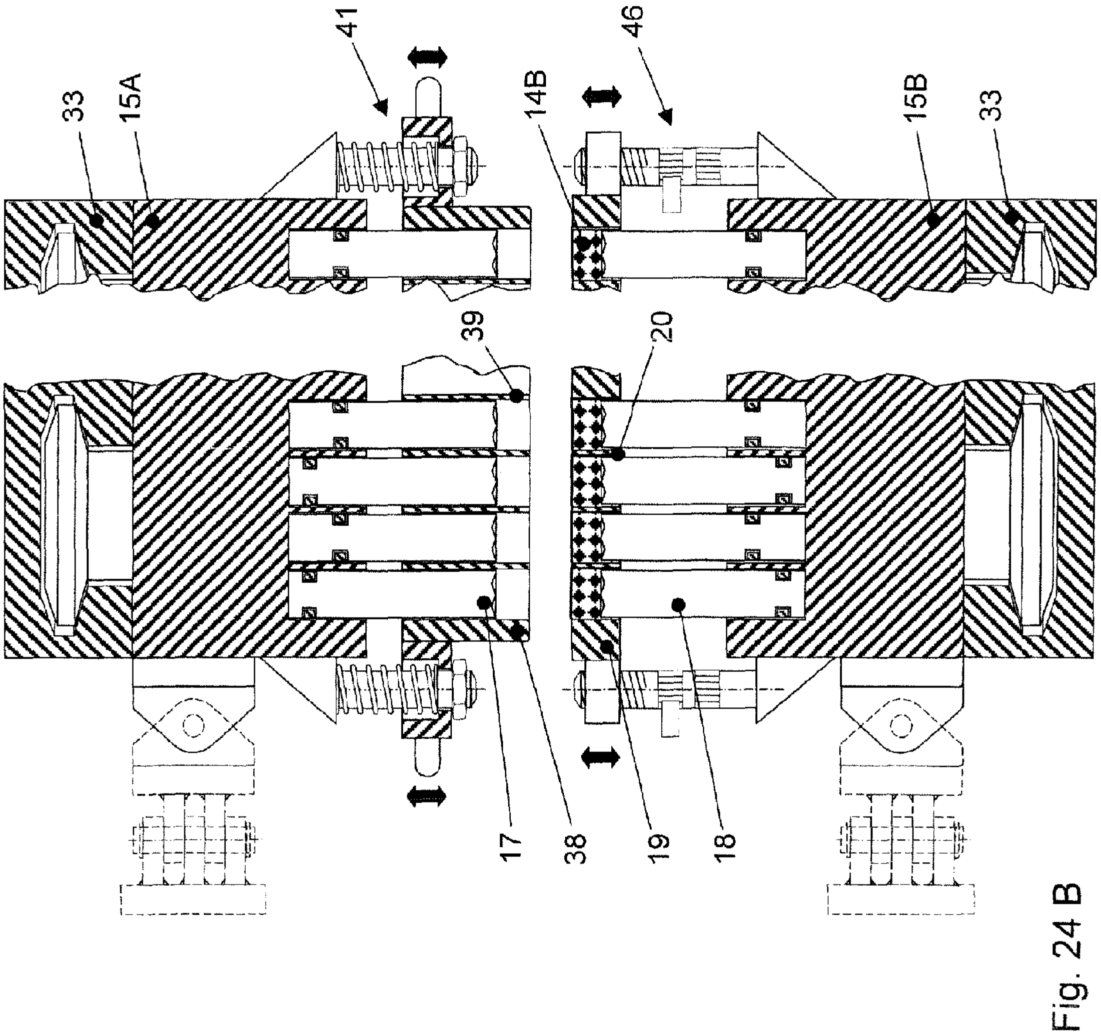
Figure 25A:
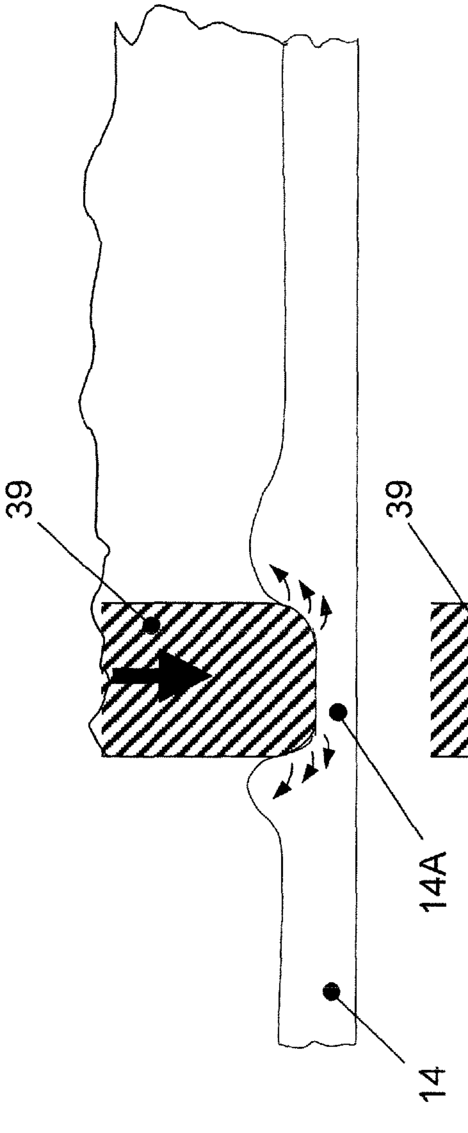
Figure 25B:
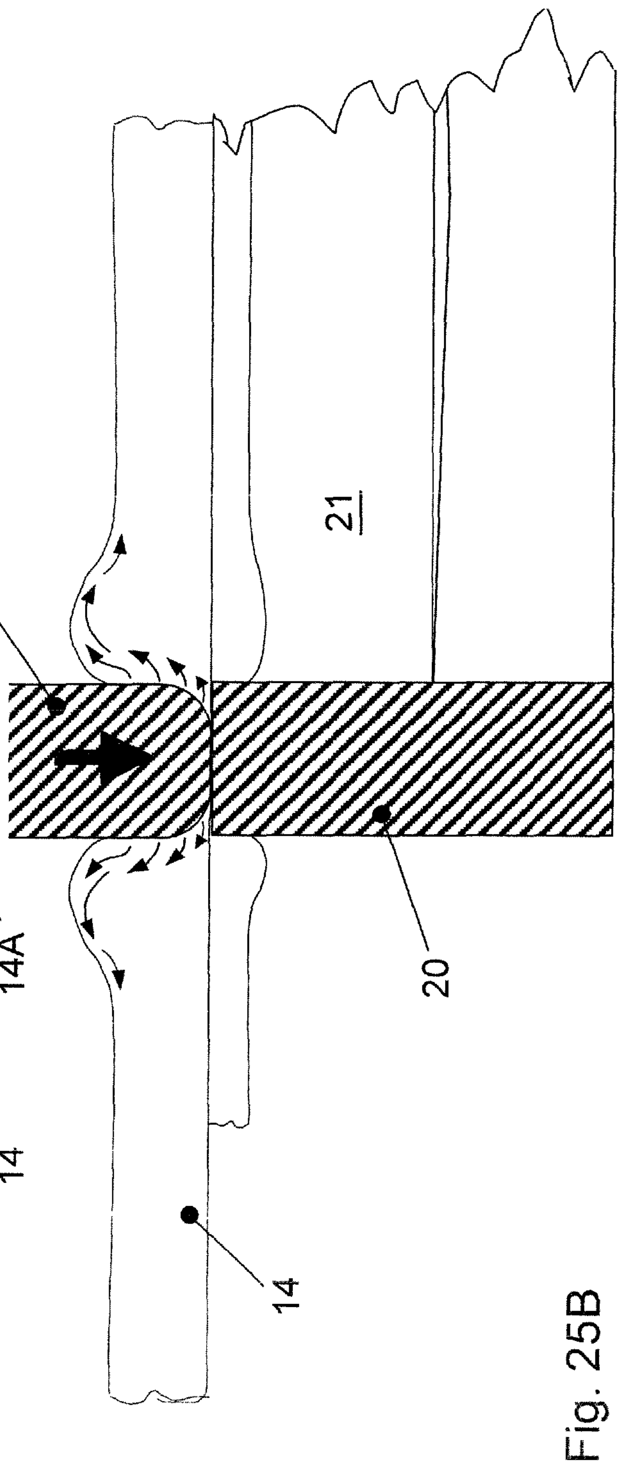
Figure 26A:
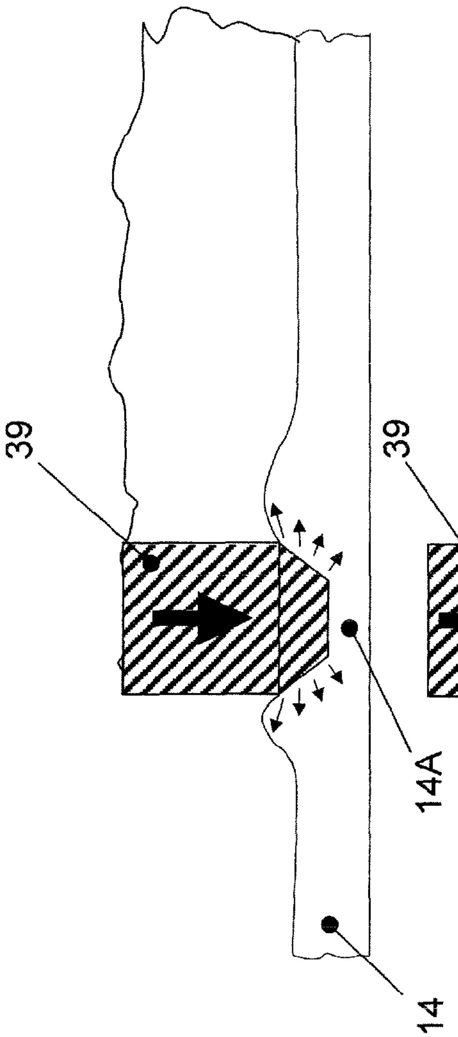
Figure 26B:
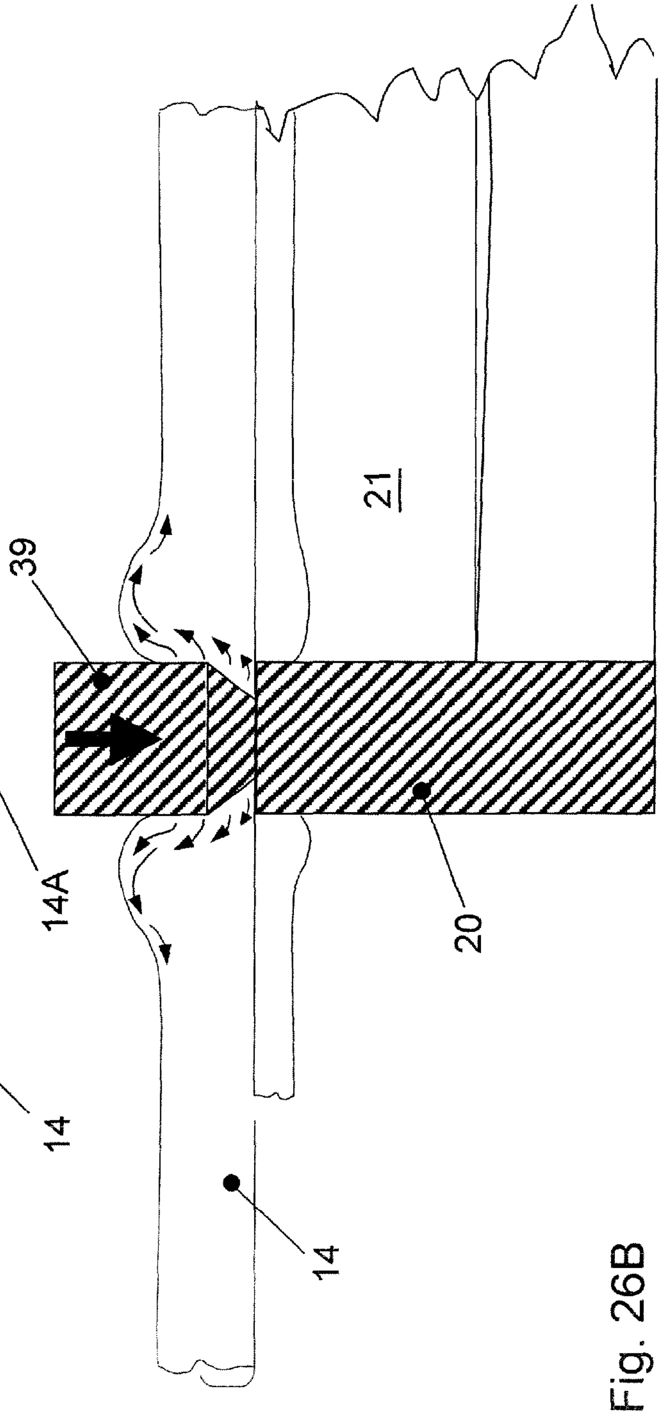
Figure 27A:
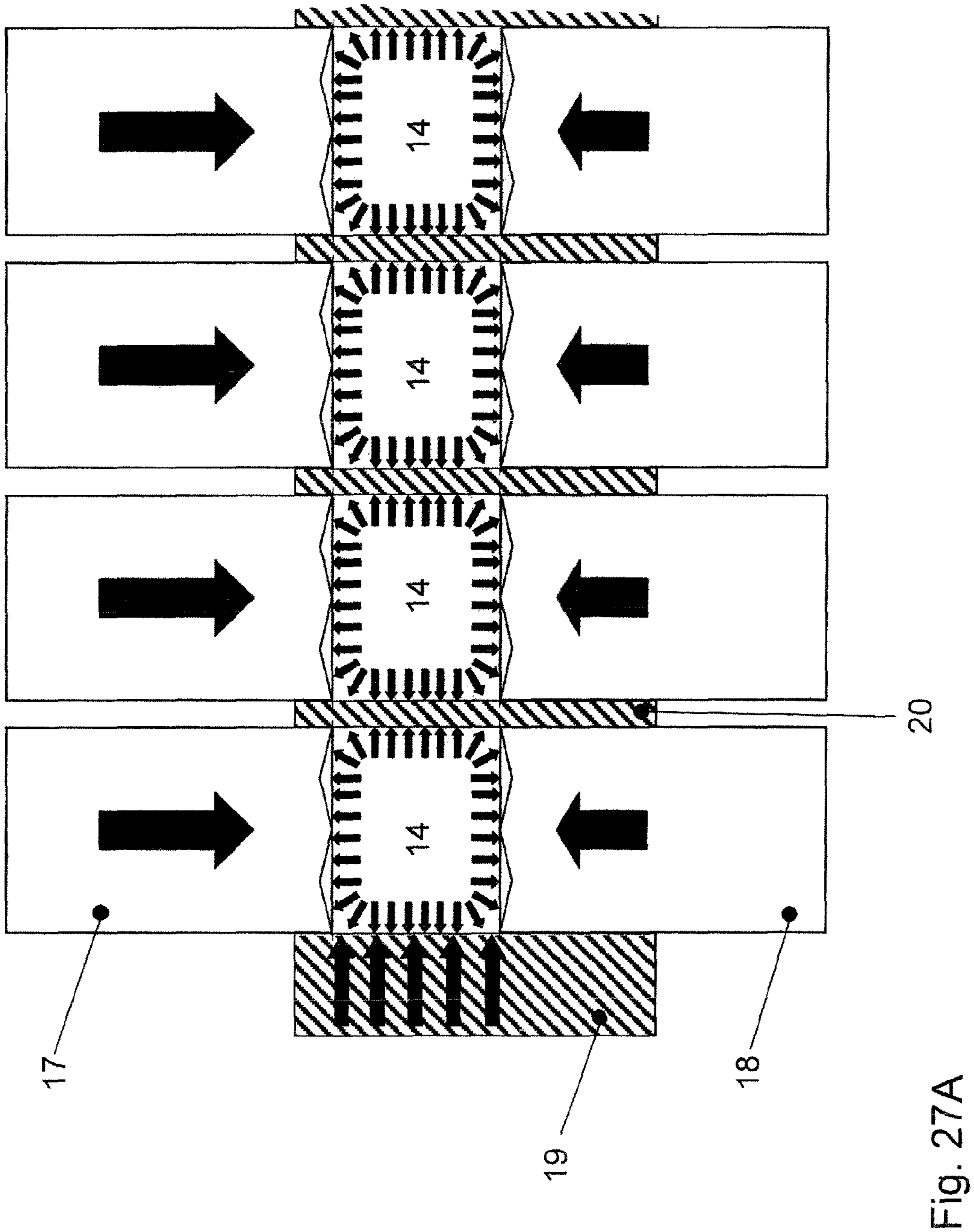
Figure 27B:
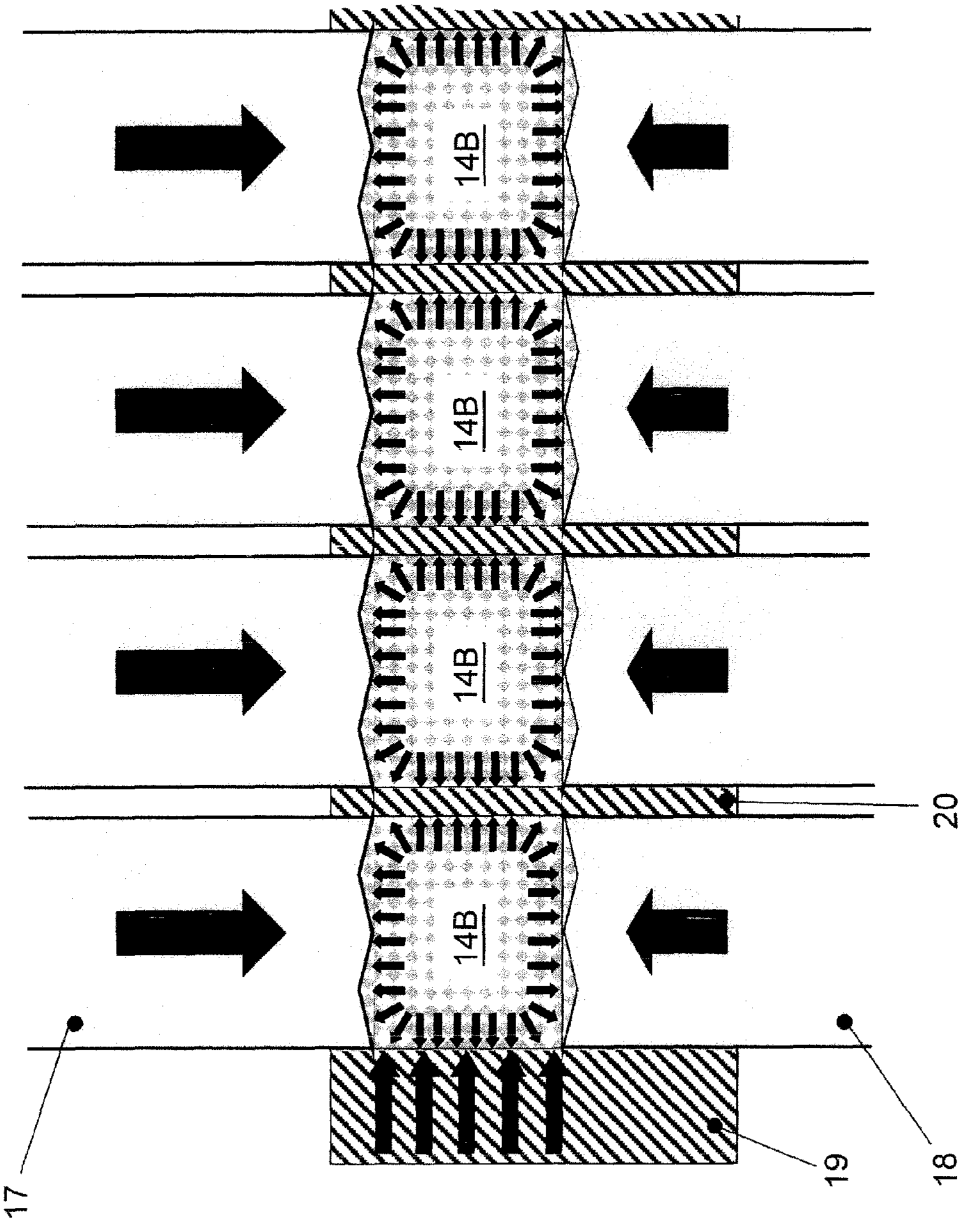
Figure 28:
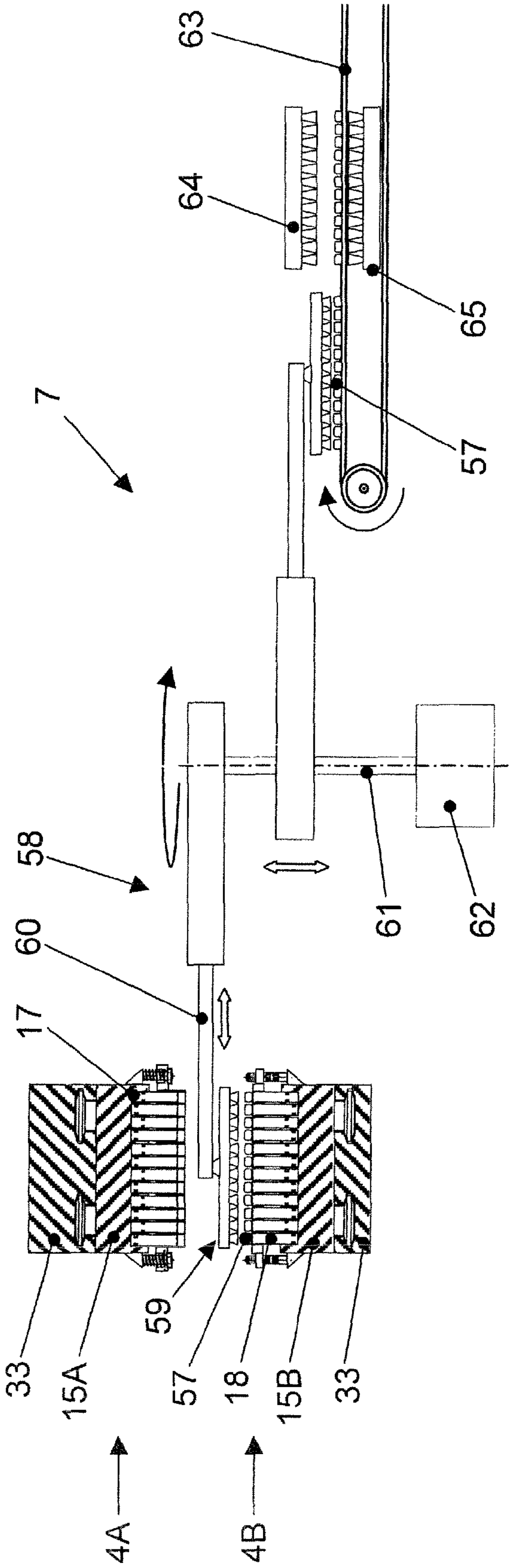
Figure 29:
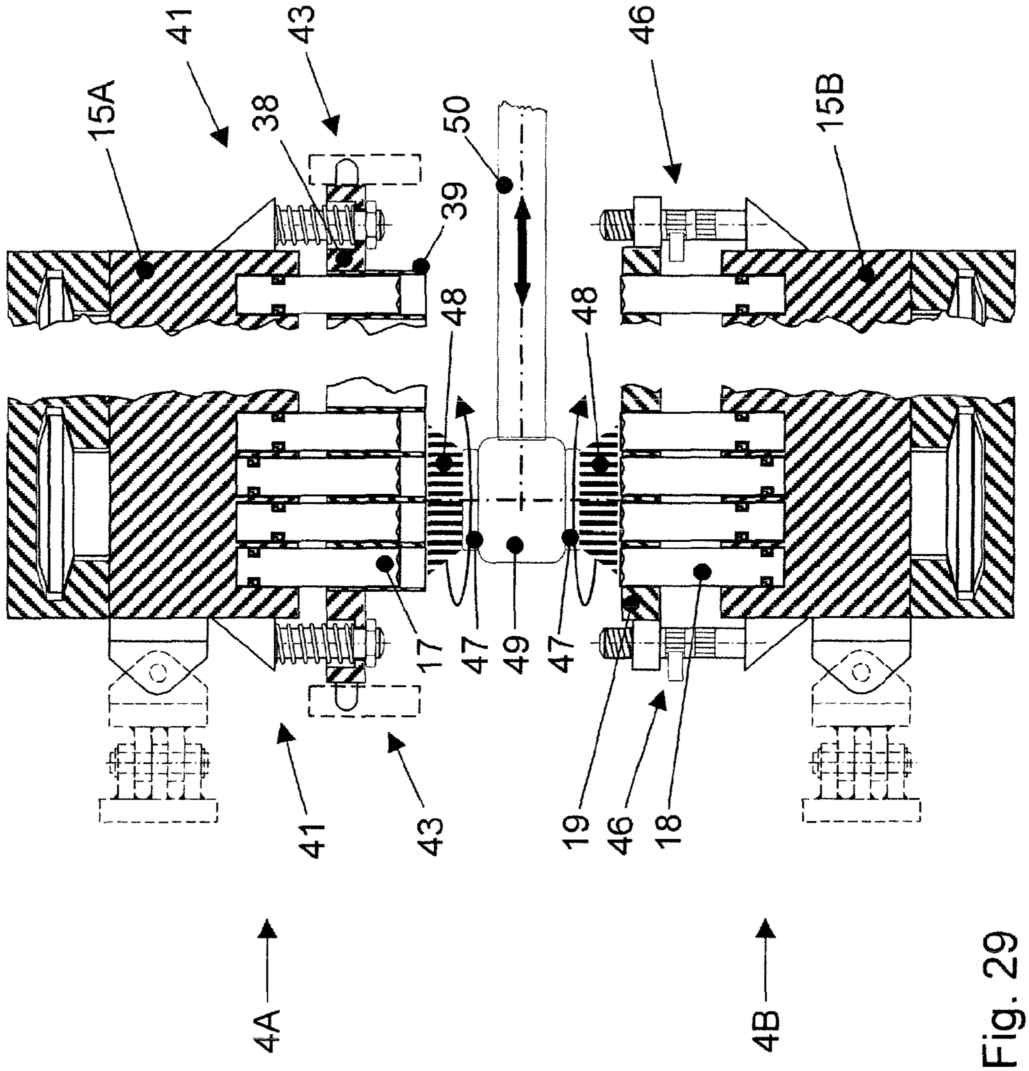
Figure 30A:
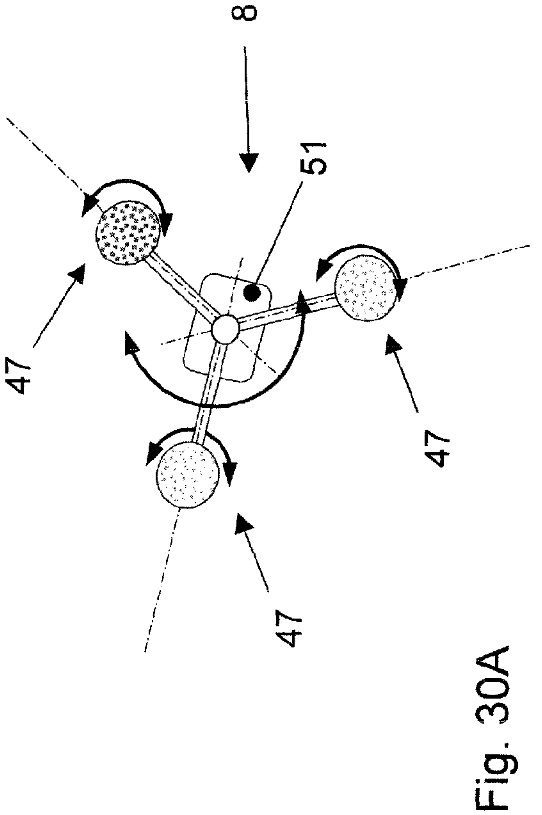
Figure 30B:
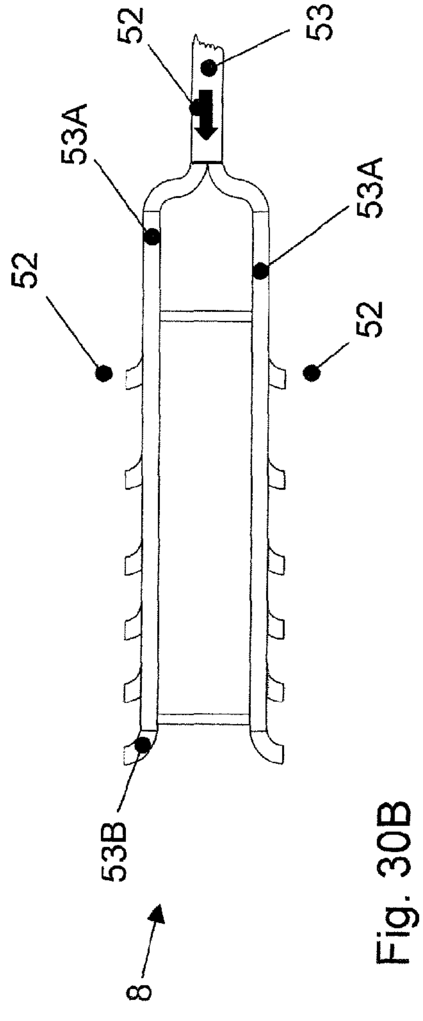
Figure 31:
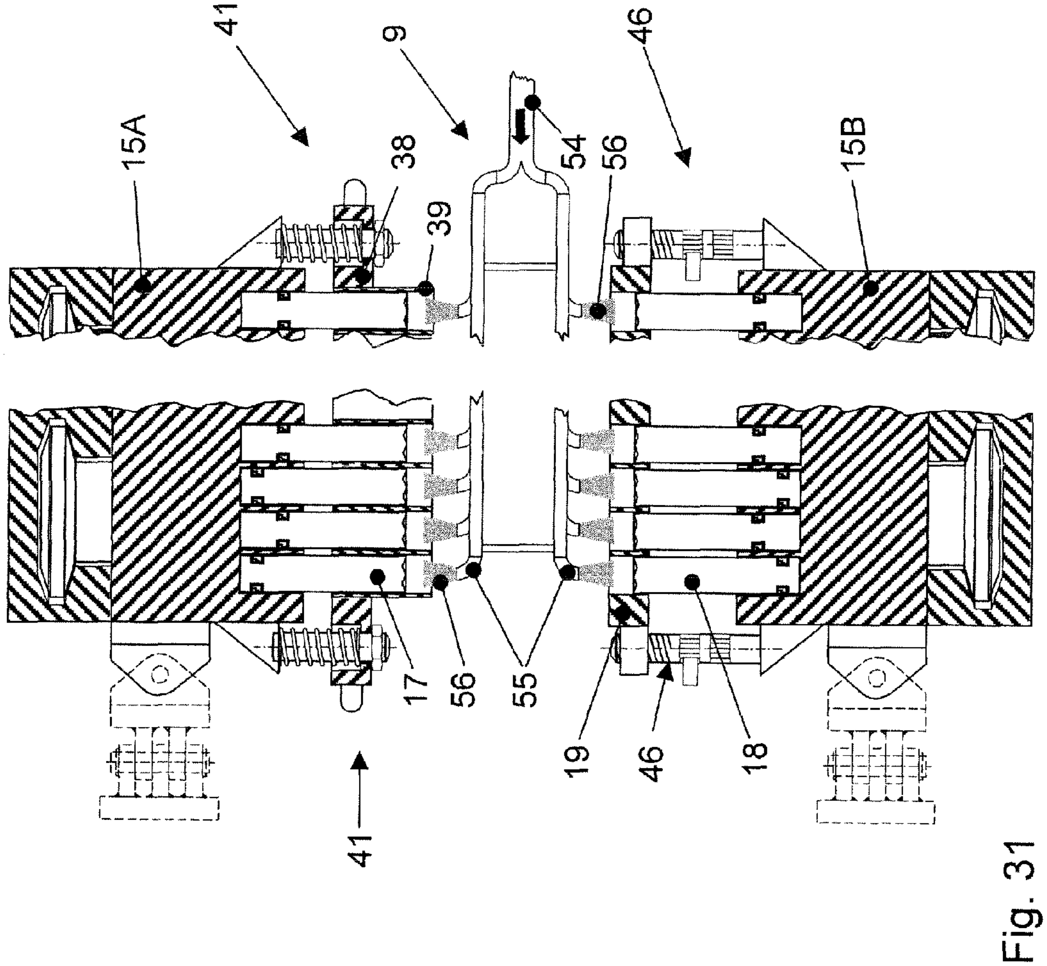

The invention is now explained in detail on the basis of exemplary embodiments with reference to the drawings:

FIG. 1 schematically shows the overall setup of the device according to an exemplary embodiment of the invention, FIG. 2 shows a cutout of the device shown in FIG. 1 in which the various stations of the device can be seen, FIG. 3 shows the traveling curve, which can be changed in height on both sides, of the upper and lower parts of the molding unit when traveling on a curve according to the molding process, FIG. 4 shows the traveling curve, which can be changed in height on both sides, of the upper and lower parts of the molding unit when traveling on a curve according to the molding process, FIG. 5 shows a side view of the traveling curves shown in FIGS. 3 and 4 of the device according to the exemplary embodiment of the invention, FIG. 6A shows the die of an extruder of the device according to the exemplary embodiment of the invention, in particular for the production of multilayer moldings/multilayer tablets, FIG. 6B shows a view of a detail of FIG. 6A, FIG. 7A shows another configuration of the die of the extruder of the device according to an exemplary embodiment of the invention, in particular for the production of multilayer moldings/multilayer tablets, FIG. 7B shows a view of a detail of FIG. 7A, FIGS. 8A to 8D show the bringing together of the upper and lower parts of the molding unit for the extruder in the case of the device according to the exemplary embodiment of the invention, FIG. 9 shows the molding unit of the device according to the exemplary embodiment of the invention in detail, FIG. 10 shows the telescopic arm of the device according to the exemplary embodiment of the invention, FIG. 11 shows the traveling and moving path of the lower part of the tool carrier in the region of the molding portion of the device according to the exemplary embodiment of the invention, FIG. 12 shows a view of a detail of the guide pin in the region of the molding portion of the device according to the exemplary embodiment of the invention, FIG. 13 shows a detail of the guide pin in the slotted guide, FIG. 14A shows a plan view of an example of a tool, FIGS. 14B and 14C show a perspective view of an example of a tool, FIG. 15A shows a plan view of another tool, FIG. 15B shows a perspective view of this other tool, FIG. 16A shows a plan view of a further tool, FIG. 16B shows a perspective view of the further tool, FIG. 17 shows a sectional view of the tool in the tool carrier of the device according to the exemplary embodiment of the invention, FIG. 18 shows a special tool of the device according to the exemplary embodiment of the invention, FIG. 19 shows a detail of the special tool shown in FIG. 18, FIG. 20 shows a sectional view of the upper tool carrier and the parts connected to it of the device according to the exemplary embodiment of the invention, FIG. 21 shows the displacement partition of the device according to the exemplary embodiment of the invention, FIG. 22 shows the lower tool carrier and the parts connected to it of the device according to the exemplary embodiment of the invention, FIG. 23 shows the die grid of the device according to the exemplary embodiment of the invention, FIG. 24A shows the interaction between the upper and lower tool carriers during the processing of melts, FIG. 24B shows the interaction between the upper and lower tool carriers during the processing of bulk materials, FIGS. 25A and 25B illustrate the action of a first example of the displacement partition of the device according to the exemplary embodiment of the invention, FIGS. 26A and 26B illustrate the action of a second example of the displacement partition of the device according to the exemplary embodiment of the invention, FIGS. 27A and 27B illustrate the distribution of forces in the receiving space of the die grid of the device according to the exemplary embodiment of the invention, FIG. 28 shows the molding removal and camera inspection station of the device according to the exemplary embodiment of the invention, FIG. 29 shows the cleaning station of the device according to the exemplary embodiment of the invention, FIG. 30 shows a further part of the cleaning station of the device according to the exemplary embodiment of the invention and FIG. 31 shows the mold space coating unit of the device according to the exemplary embodiment of the invention.

With reference to FIGS. 1 and 2, an overview is given of the overall setup of the device for forming moldings from the moldable material:

The device comprises an extruder 1, with which a moldable material can be formed. The moldable material is transferred from the die of the extruder 1 into a rotating mechanical system in which the moldings are formed. The basic setup of this rotating mechanical system is explained below.

A rotatable drive unit 2 is provided and has radially outwardly extending telescopic arms 5 fastened to it. Molding units 4 are fastened to the radially outer ends of the telescopic arms 5. As explained later, a molding unit is made up of an upper part 4A and a lower part 4B. A telescopic arm 5A or 5B is respectively provided both for the upper part 4A and for the upper part 4B. The telescopic arm 5A for the upper part 4A and the telescopic arm 5B for the lower part 4B of the molding unit 4 are arranged parallel, lying vertically one above the other. The drive unit 2 consequently comprises the telescopic arms 5A for the upper part 4A of the molding unit 4 in an upper horizontal plane and the telescopic arms 4B for the lower part 4B of the molding unit 4 in a lower horizontal plane. The telescopic arms 5 with the molding units 4 are consequently moved by the drive unit 2 substantially in an upper and a lower horizontal plane.

The molding units 4 are guided on a guideway 3. The guideway 3 describes a closed curve with straight portions A and B (FIG. 2) and a semicircular portion, which is arranged opposite the portions A and B. In order that the molding units 4 can be guided on this guideway 3 by a rotation of the drive unit 2, the radial length of the telescopic arms 5 is variable. Furthermore, the guideway 3 can also vary the position of the molding units 4 in the vertical direction. For this purpose, the telescopic arms 5 may perform a vertical pivoting movement, i.e. a pivoting movement about the axis which is parallel to an axis that is tangential with regard to the rotational movement of the drive unit 2. To limit the vertical pivoting movement, lateral guides are provided where the telescopic arms 5 are fastened at their axes to the drive unit 2. The telescopic arms 5 can consequently be moved horizontally by the drive unit 2, being able during this movement to perform vertical pivoting movements, with the paths being predetermined by the guideway 3.

The various portions which the guide path runs through are described with reference to FIG. 2:

The die of the extruder 1 is followed directly by a molding portion A, in which the guideway 3 runs over a straight section. The molding portion A is followed by a cooling portion B, which may also run over a straight section. Downstream of the cooling portion B, the guideway 3 changes its direction in a 90° bend and feeds the molding units 4 to a sampling station 6 at the portion C. After the portion C, the guideway 3 describes a semicircle, in which the molding units 4 are fed to a molding removal and camera inspection station 7 at the portion D, a cleaning station 8 at the portion E and a molding space coating device 9 at the portion F. The individual stations and devices of these portions are described in detail later.

Once the molding units 4 have left the molding space coating device 9, they are returned to the molding portion A by way of a 90° bend. Since the closely arranged molding units 4 in this constellation cannot carry out a curved movement beyond their diagonal, diversionary traveling curves are formed for the guideway and are explained below with reference to FIGS. 3 to 5:

FIG. 3 shows an upper guideway 3A for the upper part 4A of the molding unit 4 and a lower guideway 3B for the lower part 4B of the molding unit 4. In FIG. 3, the moving apart of the upper and lower parts 4A and 4B of the molding unit 4 is shown. FIG. 4 shows the moving together of the respective parts of the molding unit 4. The upper guideway 3A and the lower guideway 3B are respectively divided once again into an upper and a lower part, on which feeding is respectively carried out alternately to the two parts of the molding unit 4. The control takes place by way of diverters, which brings about the diversion into the respective traveling curves. In FIG. 5, a side view which shows the movement of the upper telescopic arm 5A for the upper part 4A of the molding unit 4 and the lower telescopic arm 5B for the lower part 4B of the molding unit 4 is shown.

The extruder 1 is described with reference to FIGS. 6 and 7:

In the device according to the invention, an extruder 1 that is known per se can be used. The configuration of the extruder 1 depends on the material that is to be processed in the extruder 1. The materials to be processed may, for example, be intended for use in the pharmaceutical industry, in the food industry and in the cosmetics and hygiene industries. A plastic melt is produced and discharged from the extruder die 10 as a strand of melt 11. The strand of melt 11 may be formed by just one melt. However, as shown in FIG. 6, a multilayered strand of melt 11 can also be formed, comprising for example two components A and B in three layers of the sequence ABA. Equally, as shown in FIG. 7, the extruder 1 may be formed in such a way that a three-component extrusion takes place in five layers of the sequence ABCBA.

As shown in FIG. 8A, the strand of melt 11 discharged by the extruder die 10 is fed to a molding station 13, at which counter-rotating rolls 12A and 12B smooth the strand of melt 11 to form a ribbon of melt 14. Furthermore, at the molding station 13, the width of the ribbon of melt 14 can be set exactly. The width of the ribbon of melt 14 depends on the width of the die grid 19, as explained later. The width is produced by narrowing guide baffles. In this case, corresponding sloping-sided preforming prisms 12B undertake the task of reducing the mass at the sides of the ribbon of melt.

FIGS. 8B to 8D show the interaction of the rolls 12A and 12B of the molding station and the molding of the strand of melt 11 to form the ribbon of melt 14 downstream of where the material emerges from the die 10. The movements of the rolls and prisms are in this case controlled according to the volume and the density of the melt by means of software.

Consequently, the thickness and the width of the ribbon of melt from which the moldings are formed are exactly set by the molding station. The setting ensures that the masses of the individual moldings are always the same. Furthermore, the height, and consequently the mass, of the molding to be formed, can be set by way of the thickness of the ribbon of melt 14. In the molding station, a pre-compaction of the moldable material takes place, leading to greater stability of the ribbon of melt 14. The thickness of the ribbon of melt 14 in this case depends on the consistency of the melt, its density and the desired individual weights of the moldings to be produced from it.

As can be further seen from FIG. 8A, the molding units 4 are guided on the guideway in such a way that, downstream of the molding station 13 for the melt of the extruder 1, the upper part 4A of the molding unit 4 comes closer to the lower part 4B of the molding unit 4. In this molding portion A (FIG. 2), they form a unit, by which the moldings are formed from the ribbon of melt 14.

The molding unit 4 is described in detail below with reference to FIG. 9:

The molding unit 4 comprises a tool carrier 15, which is divided into an upper tool carrier 15A and a lower tool carrier 15B. The upper tool carrier 15A is fastened to an upper telescopic arm 5A, the lower tool carrier 15B is fastened to a lower telescopic arm 5B. The telescopic arms 5A and 5B are arranged parallel to one another in a vertical plane. As already described with reference to FIGS. 1 and 2, they are moved horizontally, it being possible for them to perform vertical pivoting movements in a way corresponding to the guideway 3. If, as shown in FIG. 9, the upper and lower tool carriers 15A and 15B are arranged adjacent one another, as is the case for example with the molding portion A, the upper and lower tool carriers 15A and 15B are aligned with one another by means of guide rods 22. Guided by these guide rods 22, the upper and lower tool carriers 15A and 15B can be moved further toward one another.

The upper and lower tool carriers 15A and 15B in each case comprise a number of guide pins 16A and 16B, respectively, which hold and guide the upper tool carrier 15A in two upper guideways 3A. The two upper guideways 3A are arranged at the same level, with different radii with regard to the rotational movement of the drive unit 2. The lower guide pins 16B correspondingly hold and guide the lower tool carrier 15B in lower guideways 3B. In the present exemplary embodiment, three guide pins 16A and 16B are respectively provided for the upper and lower tool carriers 15A and 15B. They respectively hold the two tool carrier parts 15A and 15B in a horizontal position. Of the three guide pins 16A and three guide pins 16B, two guide pins 15A and two guide pins 15B are arranged for the outer guideway 3A and 3B, respectively, and the individual guide pins 16A and 16B are arranged for the inner guideway 3A and 3B, respectively, in order to obtain dependable curving behavior of the tool carrier 15.

The upper and lower tool carriers 15A and 15B respectively receive the same number of identical tools 17 and 18. Furthermore, arranged between the upper tool carrier 15A and the lower tool carrier 15B are a die grid 19 and a displacement partition 38, as explained in detail later. Both the die grid 19 and the displacement partition 38 are guided by means of the guide rods 22.

The coupling of the upper and lower tool carriers 15 to the telescopic arm 5 is described with reference to FIG. 10:

The telescopic arm 5 comprises two parts which can be displaced in relation to one another, so that the length of the telescopic arm is variable. In this way, the radial distance of the tool carrier 15 from the drive unit 2 can be changed. At the radially outer end of the telescopic arm 5, a horizontal/vertical two-axis fork joint 23 is fastened. The two-axis fork joint 23 comprises a fastening unit 24, which is fastened to the radially outer end of the telescopic arm 5. The horizontal joint 26 of the two-axis fork joint 23 is fastened to the fastening unit 24 by way of a pin 25.

The horizontal joint 26 is pivotable about the axis of the pin 25 in a first plane. In the case of the arrangement of the telescopic arm 5 in the device according to the invention, this first plane is horizontally aligned. The vertical joint 28 of the two-axis fork joint 23 is fastened to the horizontal joint 26 by way of a further pin 27. The vertical joint 28 is pivotable in a second plane, which is perpendicular to the first plane. In the case of the arrangement of the telescopic arm 5 in the device according to the invention, the vertical joint 28 is pivotable in a vertical plane. Finally, the upper tool carrier 15A or the lower tool carrier 15B is fastened to the vertical joint 28. The two-axis fork joint 23 consequently provides a firm connection between the telescopic arm 5 and the corresponding part of the tool carrier 15. In this way, the tool carrier 15 can reach all positions in all three spatial directions within the path of the guideway 3 in a trouble-free and smoothly proceeding manner.

Since the drive unit 2 represents the only motor-driven element of the device according to the invention with regard to the movement of the molding units 4, the telescopic arms 5 ensure that the force of the drive unit 2 is transmitted to the tool carriers 15 connected to them, so that said tool carriers can move on the predetermined guideway 3. The two-axis fork joint 23 and the vertical pivotability of the telescopic arm 5 thereby ensure that it is possible to compensate in a force-transmitting sense for each individual movement of the tool carriers 15 on the guideway 3.

The guidance of the lower tool carrier 15B in the guideway 3B is explained with reference to FIGS. 11 to 13:

The lower guide pins 16B comprise a mushroom head 29, which is held and guided in a slotted guide 33 in all portions of the guideway 3 apart from the molding portion A (FIG. 2). The slotted guide is represented in FIG. 13. The mounting and guidance in the molding portion A is represented in FIGS. 11 and 12. In the case of this portion A, the guide pin 16B leaves the slotted guide 33 and is guided and held by a system of guide rollers. The system of guide rollers comprises guide rollers 30 which are arranged close together and are rotatable in the direction of the guideway 3B. The end face of the mushroom head 29 always rests in each case on two guide rollers 30, in order to ensure smooth running of the lower tool carrier 15B. To keep the guide pins 16B in lateral position, two lateral guide plates 32 are arranged on both sides of the mushroom head 29 of the guide pin 16B.

A separately activatable level control 31, which can move or adjust the guide roller 30 in its height, is provided for each individual guide roller 30. This allows the final deforming forces to be controlled. In this way it can be ensured that the moldings are of exactly the desired strengths. For this purpose, the level control 31 may be coupled with a weighing cell unit, which follows the camera inspection station 7. The weighing cell unit may have a stored-program controller, in order to transmit a controlled variable to the level control 31 to control the depths of penetration of the individual tools 17 and 18, whereby a change in the masses of the individual moldings is achieved, as explained later.

The mounting and guidance of the upper tool carrier 15A by way of the upper guide pins 16A in the upper guideways 3A corresponds substantially to the guidance and mounting of the lower tool carrier 15B. The mushroom head 29 of the upper guide pin 16A is received by a slotted guide 33 of the upper guideway 3A. As a difference from the guidance of the lower guide pin 16B, however, a slotted guide 33 is also provided in the molding portion A, since it is not necessary to adjust both the lower tool carrier 15B and the upper tool carrier 15A in the vertical direction.

Various examples of tools 17, 18 and their fastening in the respective tool carriers 15A and 15B are explained with reference to FIGS. 14 to 19. FIGS. 14 to 19 show the tools 18, which are fastened to the lower tool carrier 15B. The tools 17 may be formed identically or similarly to the tools 18 and be fastened in the same way to the upper tool carrier 15A.

The tools 17 and 18 are formed in the manner of punches. They have an end face 35, which is chosen to correspond to the desired surface of the molding, as shown in FIGS. 14A to 16A. The tools 17 and 18 are secured in a floating manner in the tool carrier 15A, singly or in twos, by means of internal securing bars 34 to prevent them from falling out. A securing bar 34 thereby secures a series with tools 17 and 18. This makes a very close arrangement of the tools 17 and 18 possible. The number of securing bars 34 depends on the intended use of the tools 17 and 18 and on their function.

A special tool 36 is shown in FIG. 18. It comprises heating or cooling bores 37, into which a fluid can be introduced in order to heat or cool the tool 36.

The parts connected to the upper tool carrier 15A are explained with reference to FIG. 20:

The radially inner side of the upper tool carrier 15A is connected to the telescopic arm 5A by way of the two-axis fork joint 23, as explained with reference to FIG. 10. The upper side of the upper tool carrier 15A is mounted by way of the upper guide pin 16A in the slotted guide 33 of the upper guideway 3A. Furthermore, the tools 17 are mounted by way of the securing bars 34 in the lower side of the upper tool carrier 15A, as explained with reference to FIGS. 14 to 19.

Finally, the displacement partition 38 is coupled with the upper tool carrier 15A by way of the connecting mechanism 41. The connecting mechanism 41 comprises a spring 42, which, in the rest position of the spring 42, holds the displacement partition 38 in such a way that the upper face of the displacement partition 38 is at a distance from the lower face of the upper tool carrier 15A. The displacement partition 38 can be moved against the force of the spring 42 vertically in the direction of the upper tool carrier 15A.

The displacement partition 38 is shown in detail in FIG. 21. It comprises a grid, in which the openings of the grid are delimited by lateral limiting elements 39 of the displacement partition 38. In the case of the rectangular grid structure that is shown in FIG. 21, each opening of the grid is delimited by four side walls. The underside of the grid of the displacement partition 38 has a grid-like end face 40. Finally, the displacement partition 38 has bores 44 for the guide rods 22 of the tool carrier 15 (FIG. 9).

The parts coupled with the lower tool carrier 15B are explained with reference to FIG. 22:

The lower tool carrier 15B is coupled with the lower telescopic arm 5B by way of the two-axis fork joint 23, as explained with reference to FIG. 10. The lower side of the lower tool carrier 15B is guided and mounted by way of the lower guide pins 16B, by way of the slotted guide 33, or by way of the system of guide rollers explained with reference to FIG. 11. Furthermore, the tools 18 are mounted by way of the securing bars 34 in the upper side of the lower tool carrier 15B.

Finally, the die grid 19 is coupled with the lower tool carrier 15B by way of the height-adjustable connecting mechanism 46. The die grid 19 comprises receiving spaces 21, which are delimited by lateral limiting elements 20. The lower openings of the receiving spaces 21 of the die grid 19 are closed by the tools 18 protruding into the receiving spaces 21. Since the volume of the receiving space 21 determines the volume of the molding to be formed, and consequently, given a specific density, also the mass or the weight, the mass or the weight of the moldings can be set by way of the height setting of the tools 18.

A plan view of the die grid 19 is shown in FIG. 23. The rectangular grid structure, which is formed by the end face 45 of the die grid 19, can be seen. The end faces 35 of the tools 18, which protrude into the receiving spaces 21 and are held in the lower tool carrier 15B by way of the securing bars 34, can also be seen. Finally, bores for the guide rods 22 are provided in the die grid.

Since the tools 17 move in the displacement partition 38 and the tools 18 are in the receiving spaces 21 of the die grid 19, the tools 17 are also referred to as tools on the displacement partition side and the tools 18 are also referred to as tools on the die side.

It is explained with reference to FIG. 24A how the individual parts of the molding unit 4 interact to portion the ribbon of melt 14 and compress it in the receiving spaces 21 of the die grid 19:

The molding operation takes place on the straight section of the molding portion A of the guideway 3 (FIG. 2). At the beginning of the molding portion A, the upper part 4A of the molding unit 4, i.e. the upper tool carrier 15A and the parts connected to it, is moved vertically toward the lower part 4B of the molding unit 4, i.e. the lower tool carrier 15B and the parts connected to it. At the same time, the ribbon of melt 14 formed by the molding station 13 is fed to the lower part 4B of the molding unit 4. As can be seen from FIG. 24A, the ribbon of melt 14 thereby comes to lie on the upper side of the die grid 19, i.e. in particular on the end face 45, which is formed by the lateral limiting elements 20 of the die grid 19. The ribbon of melt 14 is consequently located above the receiving spaces 21 of the die grid 19. The distance between the underside of the displacement partition 38 and the upper side of the die grid 19 is at first greater than the thickness of the ribbon of melt 14, so that the latter can be introduced between the die grid 19 and the displacement partition 38.

As the molding unit 4 advances further in the molding portion A, driven by the drive unit 2, the upper tool carrier 15A is lowered further with the displacement partition 38, until the lower end face 40 of the displacement partition 38 comes into contact with the upper surface of the ribbon of melt 14. With further lowering of the upper tool carrier 15A with the displacement partition 38, the portion 14A of the ribbon of melt 14 that is located between the end face of the die grid 19 and the end face 40 of the displacement partition 38 is then displaced in the direction of the adjacent receiving spaces 21, as is shown in FIGS. 25A and 25B and in FIGS. 26A and 26B.

As the upper tool carrier 15A is lowered with the displacement partition 38 during the operation of displacing the ribbon of melt 14, the distance of the displacement partition 38 from the upper tool carrier 15A is reduced, counter to the force of the springs 42. At the same time, tilting of the displacement partition 38 is prevented by the guide rods 22. The strength of the springs 42 is designed such that they allow the displacement partition 38 to sink into the ribbon of melt 14. The upper tool part 15A following thereafter thereby increases the pressure which the displacement partition 38 exerts on the ribbon of melt 14, by means of the ever more compressed springs 42. To distribute, i.e. displace, the materials of the melt 14A under the end face 40 of the displacement partition 38 in all directions during the lowering of the displacement partition 38, the edges of the end face 40 of the displacement partition 38 are specially formed. A displacement partition 38 in which the edges of the transition from the end face 40 to the side faces of the lateral limiting elements 39 of the displacement partition 38 are rounded is shown in FIG. 25B. A displacement partition in which these edges are beveled is shown in FIG. 26B. This configuration of the edges serves for a loss-free and economically optimal production sequence. It is intended here for all the excess material left lying in the receiving spaces 21 of the die grid 19 to be displaced.

The displacement partition 38 is moved toward the die grid 19 until the end face 40 of the displacement partition 38 rests on the end face 45 of the die grid 19.

As can be seen from FIGS. 21, 23 and 24, the geometric form of the displacement partition 38 corresponds to that of the die grid 19. Here it is essential that the lateral limiting elements 39 of the displacement partition 38 correspond to the lateral limiting elements 20 of the die grid 19, and consequently the end faces 40 and 45 formed by the respective lateral limiting elements 39 and 20 correspond. These lateral limiting elements 39 and 20 form the identical grid structure. The lateral limiting element 39 of the displacement partition 38 has, in particular, the same thickness as the lateral limiting element 20 of the die grid 19. Furthermore, the lateral limiting elements 39 and 20 are in line with one another. During the movement of the displacement partition 38 in the direction of the die grid 19, the lateral elements 39 and 20 are aligned exactly parallel to one another.

Once the end face 40 of the displacement partition 39 is resting on the end face 45 of the die grid 19, the upper tool carrier 15A is lowered further with the tools 17, without the vertical position of the displacement partition 38 being able to change any further, since it is resting on the die grid 19. The tools 17 are consequently moved in the openings of the displacement partition 38. The lateral limiting elements 39 of the displacement partition 38 thereby serve as a guide for the tools 17. The displacement partition 38 consequently serves as a guide chamber for the lowering tools 17 and as a prechamber for the material to be deformed. The lowering of the tools 17 has the effect that the part of the ribbon of melt 14 that is still located between the lateral limiting elements 39 of the displacement partition 38 above the receiving space 21 of the die grid 19 after the displacement is brought into the receiving spaces 21 of the die grid 19 by the end faces 35 of the tools 17. Finally, the portion of the ribbon of melt 14 that is entirely in the receiving space 21 is compressed in the receiving space 21.

FIG. 27A shows the distribution of forces in the receiving space 21 during the compression. Pressure is exerted on the portions of melt from above and below by the tools 17 and 18. The portions are enclosed from the side by the lateral limiting elements 20 of the die grid 19. Since the same pressure is exerted on the lateral limiting elements 20 of each of two adjacent receiving spaces 21, the forces on the lateral limiting elements 20 cancel one another out. For this reason, the lateral limiting elements 20, and consequently also the lateral limiting elements 39, of the displacement partition 38 can be made very thin, whereby any residual proportion of the ribbon of melt 14 that is not compressed can be kept extremely small.

The pressure that is exerted on the portions of melt 14 by the tools 17 and 18 can be chosen according to the moldings to be formed. A special feature of the device according to the invention is that the holding pressure time, i.e. the time interval in which the maximum pressure is exerted on the material to be compressed, can be set individually for the material to be deformed and can be set appropriately for this material. The holding pressure time may be chosen to be very long, in particular in comparison with conventional tableting machines. This is so because it is determined substantially by the rotational speed of the drive unit 2 and the length of the straight molding portion A. If the molding portion A is chosen to be very long, the maximum pressure exerted on the material to be molded is maintained for a very long time.

The molding portion A is followed by the cooling portion B. In this portion B, the upper part 4A of the molding unit 4 with the upper tool carrier 15A is moved in the vertical direction away from the lower part 4B of the molding unit 4 with the lower tool carrier 15B. The compressed moldings can cool down during the dwell time in the cooling portion B. In the case of the device according to the invention, this cooling portion B can be chosen to be long enough to ensure that no undesired internal stresses remain in the moldings that are formed. The cooling portion B is followed in the portion C by the sampling station 6. In the case of this station 6, a specific number of moldings may be taken in each case by means of a randomized, memory-controlled, individually activatable vacuum molding removal unit and transferred to an inspection device. The moldings removed from the basic overall whole, or their free places on the lower tool carrier 15B, are transmitted by means of the integrated stored-program controller to the molding removal and camera inspection station 7, in order to avoid erroneous inspection messages. The task of this in-process inspection station is to inspect the qualityrelated operating mode of the device according to the invention, verify it or, if appropriate, intervene in a controlling manner in the method sequence by means of a stored-program controller, and correspondingly by way of the level control 31.

The portion C with the sampling station 6 is followed by the portion D with the molding removal and camera inspection station 7, which is explained with reference to FIG. 28. Here, the scrap product 7B is separated from the acceptable product 7A by means of a 100% online visual inspection (cf. FIG. 2).

At the beginning of the portion D, the tools 18 are moved completely into the receiving space 21 of the die grid 19, so that the moldings 57 that are formed are pressed out of the die grid 19 and are ready for removal. After that, the vacuum molding removal unit 58 is pivoted between the upper tool carrier 15*a* and the lower tool carrier 15B, so that vacuum receiving tubes of the molding receiving head 59 are located directly above the moldings 57. The vacuum molding removal unit 58 has the same number of individually activatable vacuum tubes for receiving the moldings 57 as the number of tools 18 and receiving spaces 21 that are provided. The moldings are sucked up by the vacuum tubes and lifted off the die grid 19. After that, the molding receiving head 59 is pivoted out of the molding unit 4 by means of the motor 62 and the shaft 61, whereupon the moldings 57 are deposited on a transparent conveyor belt 63. On the conveyor belt 63, the moldings 57 are fed to a camera inspection unit with an upper camera 64 and a lower camera 65 for examining the upper side and underside as well as the side edges of the moldings 57.

By means of the cameras 64 and 65, the formed moldings as a whole can be visually examined. This may involve examining the entire geometric form of the moldings 57. Furthermore, the moldings 57 may be contactlessly examined by means of infrared spectroscopy, in particular NIR spectroscopy. Since the geometric arrangement of the moldings on the conveyor belt 63 corresponds precisely to that in the die grid 19, it may be possible in the case of defective moldings 57 to draw conclusions about defective production in the die grid 19. The NIR spectroscopy operates with the aid of chemometric evaluation methods on the qualitative and quantitative analytical sorting of the acceptable production 7A.

By means of an optional weighing cell unit that follows, the individual weights of the moldings 57 can be recorded. Deviations from predetermined weight tolerances can in this way be registered and used for segregating defective moldings. Furthermore, the weighing cell unit may transmit a controlled variable to the level control 31 and/or to the guide rollers, as already explained.

The portion D is followed by the portion E with the cleaning station 8, which is explained with reference to FIGS. 29, 30A and 30B:

Between the upper tool carrier 15A and the lower tool carrier 15B, at least one brush head 47 is moved in by means of a brush shaft 50. Attached to the end of the brush shaft 50 is a brush head holder 49, which has cleaning brushes 48 in the direction of the upper part 4A and the lower part 4B of the molding unit. The brush head 47 rotates and in this way cleans all the parts that have come into contact with the moldable material. In particular, the displacement partition 38 and the tools 17 as well as the die grid 19 and the tools 18 are cleaned. After the cleaning, the brush shaft 50 is rotated out of the molding unit 4. For this purpose, it is fastened on a rotating device 51, which may comprise three brush heads 47 and corresponding numbers of brush shafts 50. The brush shafts 50 rotated out of the molding unit 4 are then cleaned by means of compressed air 52, which is fed to the compressed air nozzles 53B by way of the system of pipes 53A. The entire cleaning operation takes place fully automatically and is integrated in the guideway 3. The cleaning station 8 can operate while the operation of the continuously moving molding units 4 is in progress. The cleaning station 8 may be equipped with various brushes, compressed air and extraction devices. It is fully movable in all three coordinate directions and equipped with proximity sensors and exchanging units.

The portion E with the cleaning station 8 is followed by the portion F with the molding space coating device 9, which is explained with reference to FIG. 31:

The molding space cleaning device 9 comprises a system of pipes 54, with which a coating fluid 56 or a coating powder (mold release agent) can be fed in. The coating fluid 56 or the coating powder emerges from the nozzles 55. The number of nozzles 55 preferably corresponds to the number of tools 17 and 18. The task of the molding space coating device 9 is to reduce or eliminate possible tendencies for the various materials that are to be processed to become adhesively attached, in order to ensure a smooth production sequence. For this purpose, the parts of the device that come into contact with the material to be processed are coated with the coating fluid 56 or the coating powder. The choice of coating fluid depends on the material to be molded and the intended field of use of the moldings 57 to be formed.

After passing the molding space coating device 9 in portion F, the molding units 4 are fed to the molding portion A on the guideway 3 for the renewed forming of moldings.

According to a second exemplary embodiment of the present invention, the moldable material from which the moldings 57 are formed is not formed by means of extrusion technology. Rather, in the case of this exemplary embodiment, the moldable material is a bulk material 14B of any desired composition. The bulk material 14B is, in particular, powdered, flowable and moldable. It may be, for example, powdered granules. The device according to the invention can be advantageously used in particular for a bulk material 14B, for example from granulating technology, which can be deformed very poorly, since the holding pressure time can be set to a very long time period in the case of the device according to the invention.

Since, in the case of the second exemplary embodiment, the bulk material 14B can be filled directly into the receiving spaces 21 of the die grid 19, the displacement partition 38 can be omitted in the case of the device of the second exemplary embodiment. However, it preferably continues to serve for guiding the tools 17. In the case of the second exemplary embodiment, the bulk material 14B is filled directly into the receiving spaces 21 by means of a device known per se, as used for example in the case of conventional tableting machines, as is represented in FIG. 24B. The device may be, for example, a powder distributing installation for uniformly discharging flowable, moldable, powdered bulk materials 14B, in the case of which the bulk materials 14B can be fed in continuously. After the filling of the receiving spaces 21, the compressing by the tools 17 and 18 takes place (cf. FIG. 27B) as well as the further method steps, as described above.

In the case of the second exemplary embodiment, it is particularly important that the compressive energy produced during the molding operation is transmitted to the material to be molded over a longer time period, i.e. a high pressure is exerted on the material to be molded over a longer period of time, in order in this way to counteract the material-specific forces of resilient recovery of the materials to be deformed. Furthermore, the pressure can also be maintained during the cooling portion B, in that the upper part 4A and the lower part 4B of the molding unit 4 only move apart after this cooling portion B. In this way, materials with increased elastic forces of resilient recovery are kept in the plastifying position until they solidify or cool down.

LIST OF DESIGNATIONS

1 extruder
2 drive unit
3 guideway
3A upper part of the guideway
3B lower part of the guideway
4 molding unit
4A upper part of the molding unit
4B lower part of the molding unit
5 telescopic arm
5A upper telescopic arm
5B lower telescopic arm
6 sampling station
7 molding removal and camera inspection station
7A acceptable product
7B scrap product
8 cleaning station
9 molding space coating device
10 extruder die
11 strand of melt
12A and 12B rolls of the molding station
13 molding station
14 ribbon of melt
14A portion of the ribbon of melt between the end faces of the die grid and the displacement partition
14B flowable, moldable powdered bulk material
15 tool carrier
15A upper tool carrier
15B lower tool carrier
16 guide pin
16A upper guide pin
16B lower guide pin
17 upper tools
18 lower tools
19 die grid
20 lateral limiting elements of the die grid
21 receiving spaces of the die grid
22 tool carrier guide rods
23 two-axis fork joint
24 securing unit of the telescopic arm
25 pin
26 horizontal joint of the two-axis fork joint
27 pin
28 vertical joint of the two-axis fork joint
29 mushroom head of the guide pin
30 guide rollers
31 level control of the guide rollers
32 lateral guide plates of the guideway
33 slotted guide of the guideway
34 securing bars for the tools
35 end face of the tool
36 special tool with heating or cooling bores
37 heating or cooling bores
38 displacement partition
39 lateral limiting elements of the displacement partition
40 end face of the displacement partition
41 connecting mechanism for the displacement partition
42 spring
43 raising device
44 bores for the tool carrier guide rods
45 end face of the die grid
46 volume setting mechanism for the die grid
47 brush head
48 cleaning brushes
49 brush head holder
50 brush shaft
51 rotating device for the brushes
52 compressed air
53A system of pipes for feeding in the compressed air
53B compressed air nozzle
54 system of pipes for feeding in the coating fluid
55 coating nozzles
56 coating fluid
57 moldings
58 vacuum molding removal unit
59 molding receiving head
60 extendable arm of the vacuum molding removal unit
61 shaft of the vacuum molding removal unit
62 drive of the vacuum molding removal unit
63 conveyor belt
64 camera for the upper side of the moldings
65 camera for the lower side of the moldings

The invention claimed is:

1. A device for forming moldings from a moldable material, comprising a die having at least one receiving space formed by lateral limiting elements having an end face, and at least one tool with which the moldable material in the receiving space can be compressed, characterized by a displacement partition which can be moved toward the die for portioning the moldable material, the displacement partition comprising lateral limiting elements having an end face, said lateral limiting elements of said displacement partition corresponding to the lateral limiting elements of the die, wherein the end faces of the lateral limiting elements of the displacement partition and of the lateral limiting elements of the die at least partially meet when the displacement partition and the die are moved completely toward one another and wherein the transition from the end face to the lateral limiting elements of the die and/or the transition from the end face to the lateral limiting elements of the displacement partition is rounded.

2. The device as claimed in claim 1, characterized in that the lateral limiting elements of the displacement partition are in line with the lateral limiting elements of the die.

3. A device for forming moldings from a moldable material, comprising a die in which there is formed at least one receiving space formed by lateral limiting elements having an end face, and at least one tool with which the moldable material in the receiving space can be compressed, characterized by a displacement partition which can be moved toward the die for portioning the moldable material, the displacement partition comprising lateral limiting elements having an end face, said lateral limiting elements of said displacement partition corresponding to the lateral limiting elements of the die, wherein the end faces of the lateral limiting elements of the displacement partition and of the lateral limiting elements of the die at least partially meet when the displacement partition and the die are moved completely toward one another and wherein the transition from the end face to the lateral limiting elements of the die and/or the transition from the end face to the lateral limiting elements of the displacement partition is beveled.

4. The device as claimed in claim 1, characterized in that the tool can be guided into the receiving space by the lateral limiting elements of the displacement partition.

5. The device as claimed in claim 1, characterized in that a further tool on the die side for the at least one receiving space can be guided into the receiving space from the opposite side of the tool on the displacement partition side.

6. The device as claimed in claim 1, characterized in that a multiplicity of receiving spaces are formed in the die to form a die grid and are respectively assigned a tool on the displacement partition side and a tool on the die side.

7. The device as claimed in claim 6, characterized in that the tools on the displacement partition side and the tools on the die side are each mounted in a tool carrier.

8. The device as claimed in claim 7, characterized in that the displacement partition is coupled with the tool carrier for the tools on the displacement partition side.

9. The device as claimed in claim 7, characterized in that at least one tool carrier is movable along a guideway, which has a molding portion in which a constant pressure is exerted over a section of the way by the tools on the portions of moldable material that are located in the receiving spaces.

10. The device as claimed claim 7, characterized in that the tool carrier is coupled with a rotatable drive unit by way of a telescopic arm, so that the tool carrier can be guided over a closed curve.

11. The device as claimed in claim 10, characterized in that the telescopic arm is pivotably mounted about a tangential axis with regard to the rotation of the drive unit and in that the length of the telescopic arm is variable.

12. The device as claimed in claim 1, further comprising an extruder for forming a ribbon of melt that can be fed continuously to the die.

13. The device as claimed in claim 12, characterized in that a molding device for smoothing and aligning a strand of melt to form the ribbon of melt is arranged between the extruder and the die.

14. A method for forming moldings, in which a moldable material is formed, comprising:

feeding the moldable material to a device of claim 1 or claim 3 so that the moldable material rests on the end face of lateral limiting elements of the die;

moving the displacement partition with lateral limiting elements which correspond to the lateral limiting elements of the die toward the die so that the part of the moldable material that is resting on the lateral limiting elements of the die is displaced in the direction of the receiving space formed by the die between the lateral limiting elements so that the moldable material is portioned; and compressing the portions of the moldable material in the receiving space with the at least one tool.

15. The method as claimed in claim 14, characterized in that the displacement partition is moved toward the die in such a way that the lateral limiting elements of the displacement partition are in line with the lateral limiting elements of the die.

16. The method as claimed in claim 14, characterized in that the displacement partition is moved toward the die until the end face of the lateral limiting elements of the displacement partition lie at least partly against the end face of the lateral limiting elements of the die.

17. The method as claimed in claim 14, characterized in that the displacement partition is moved toward the die against the force of at least one spring.

18. The method as claimed in claim 14, characterized in that, during compressing, the tool is guided into the receiving space by the lateral limiting elements of the displacement partition.

19. The method as claimed in claim 14, characterized in that, during compressing, a further tool on the die side for the at least one receiving space is guided into the receiving space from the opposite side of the tool on the displacement side.

20. The method as claimed in claim 19, characterized in that a multiplicity of receiving spaces are formed in the die to form a die grid and, during compressing, a pressure is exerted on the moldable material in each receiving space by a tool on the displacement partition side and a tool on the die side.

21. The method as claimed in claim 20, characterized in that the tools on the displacement partition side and/or the tools on the die side are each mounted in a tool carrier and at least one tool carrier is moved along a guideway, which has a molding portion in which a constant pressure is exerted over a section of the way by the tools on the portions of moldable material that are located in the receiving spaces.

22. The method as claimed in claim 21, characterized in that the tool carrier is coupled with a drive unit by way of a telescopic arm and is moved by means of the drive unit, so that the tool carrier is guided on the guideway over a closed curve.

23. The method as claimed in claim 14, characterized in that a ribbon of melt, which is continuously fed to the die, is formed as the moldable material.

24. The method as claimed in claim 23, characterized in that, before it is fed to the die, the ribbon of melt is smoothed and aligned.

25. The method as claimed in claim 23, wherein the ribbon of melt comprises a number of layers of different compositions.

26. The device of claim 1 or claim 3, wherein multiplicity of receiving spaces is formed in the die to form a die grid.

* * * * *